US008958361B2

(12) United States Patent
Mazzarese et al.

(10) Patent No.: US 8,958,361 B2
(45) Date of Patent: Feb. 17, 2015

(54) SYSTEM AND METHOD FOR RESOURCE MANAGEMENT IN A COMMUNICATIONS SYSTEM

(75) Inventors: David Jean-Marie Mazzarese, Beijing (CN); Zhongfeng Li, Shanghai (CN); Philippe Sartori, Algonquin, IL (US)

(73) Assignee: Futurewei Technologies, Inc., Plano, TX (US)

( * ) Notice: Subject to any disclaimer, the term of this patent is extended or adjusted under 35 U.S.C. 154(b) by 241 days.

(21) Appl. No.: 13/296,434

(22) Filed: Nov. 15, 2011

(65) Prior Publication Data

US 2012/0120891 A1 May 17, 2012

Related U.S. Application Data

(60) Provisional application No. 61/413,820, filed on Nov. 15, 2010.

(51) Int. Cl.
*H04W 4/00* (2009.01)
*H04W 72/04* (2009.01)
*H04L 5/00* (2006.01)

(52) U.S. Cl.
CPC ........... *H04W 72/0493* (2013.01); *H04L 5/003* (2013.01)
USPC .............................. 370/322; 370/329; 370/341

(58) Field of Classification Search
USPC .................................. 370/229–241, 253, 254
See application file for complete search history.

(56) References Cited

U.S. PATENT DOCUMENTS

2005/0240928 A1  10/2005  Brown et al.
2008/0261582 A1  10/2008  Sarkar et al.
2009/0175233 A1  7/2009  Ojala et al.
2010/0195583 A1  8/2010  Nory et al.
2010/0254301 A1  10/2010  Blankenship et al.
2011/0044391 A1* 2/2011  Ji et al. .......................... 375/260

(Continued)

FOREIGN PATENT DOCUMENTS

CN          101496370 A       7/2009

OTHER PUBLICATIONS

"TSG-RAN WG1 Meeting #62b", "way forward on REG definition for interleaved R-PDCCH", Oct. 11-15, 2010.*

(Continued)

*Primary Examiner* — Kwang B Yao
*Assistant Examiner* — Hardikkumar Patel
(74) *Attorney, Agent, or Firm* — Slater & Matsil, L.L.P.

(57) ABSTRACT

A method for operating a communications controller includes defining a positive integer quantity of resource element groups from a resource block with a positive integer number N resource elements in each resource element group, the resource block having a total number of resource elements, the total number of resource elements consisting of available resource elements and reserved resource elements. The method also includes assigning a plurality of available resource elements to fill in each of the positive integer quantity of resource element groups with N available resource elements in each resource element group, and blocking any unassigned available resource elements from being used in a resource element group. The method further includes interleaving a plurality of control messages onto the positive integer quantity of resource element groups, and transmitting the positive integer quantity of resource element groups.

31 Claims, 23 Drawing Sheets

(56) References Cited

U.S. PATENT DOCUMENTS

2011/0069637 A1 3/2011 Liu et al.
2011/0199986 A1* 8/2011 Fong et al. .................... 370/329

OTHER PUBLICATIONS

LG Electronics, et al., "Harmonized Proposal for CSI-RS Pattern," 3GPP TSG RAN WG1 Meeting #61b, R1-104263, Jun. 28-Jul. 2, 2010, 4 pages, Dresden, Germany.
Zte, et al., "Way Forward on REG Definition for Interleaved R-PDCCH," TSG-RAN WG1 Meeting #62b, R1-105809, Oct. 11-15, 2010, 5 pages, Xi'an, China.
"Final Report of 3GPP TSG RAN WG1 #61bis v1.0.0," 3GPP TSG RAN WG1 Meeting #62, R1-104271, Aug. 23-27, 2010, 92 pages, Madrid, Spain.
"Final Report of 3GPP TSG RAN WG1 #62 v1.0.0," 3GPP TSG RAN WG1 Meeting #62bis, R1-105116, Oct. 11-15, 2010, 91 pages, X'ian, China.
"Universal Mobile Telecommunications System (UMTS); LTE; Evolved Universal Terrestrial Radio Access (E-UTRA); Physical layer for relaying operation (3GPP TS 36.216 version 10.3.0 Release 10)," ETSI TS 136 216 V10.3.0, Jun. 2011, 18 pages.
International Search Report received in Patent Cooperation Treaty Application No. PCT/US2011/60810, mailed Mar. 28, 2012, 2 pages.
Written Opinion of the International Searching Authority received in Patent Cooperation Treaty Application No. PCT/US2011/60810, mailed Mar. 28, 2012, 5 pages.
Catt, "Details on R-PDCCH interleaving in LTE-A," 3GPP TSG RAN WG1 meeting #62, R1-104339, Agenda Item: 6.6.1, Aug. 23-27, 2010, 5 pages.
"Extended European Search Report," Application No. 11841361.6, Applicant: Huawei Technologies Co., Ltd., Oct. 28, 2013, 11 pages.
Nokia, "On the need of interleaving of R-PDCCH," 3GPP TSG RAN WG1 Meeting #59, R1-094667, Agenda Item: 7.8.1.2, Nov. 9-13, 2009, 3 pages.
Zte, "Way Forward on REG Definition for Interleaved R-PDCCH," TSG-RAN WG1 Meeting #62b, R1-105809, Oct. 11-15, 2010, 5 pages.
First Chinese Office Action received in Chinese Application No. 201180053664.9 mailed Aug. 29, 2014, 6 pages.
Chinese Search Report received in Chinese Application No. 2011800536649 mailed Aug. 22, 2014, 2 pages.

* cited by examiner

CRS  CSI-RS

REG DEFINITION W/O CRS

REG DEFINITION W CRS

REG DEFINITION W CSI-CRS

SYSTEM AND METHOD FOR RESOURCE MANAGEMENT IN A COMMUNICATIONS SYSTEM

This application claims the benefit of U.S. Provisional Application No. 61/413,820, filed on Nov. 15, 2010, entitled "Resource-Element Groups for R-PDCCH," which application is hereby incorporated herein by reference.

TECHNICAL FIELD

The present invention relates generally to digital communications, and more particularly to a system and method for resource management in a communications system.

BACKGROUND

Evolved Universal Mobile Telecommunications System (UMTS) Terrestrial Radio Access Network (e-UTRAN or EUTRAN) is an air interface of The Third Generation Partnership (3GPP) Long Term Evolution (LTE) upgrade path for mobile communications systems. e-UTRAN is also known as Evolved Universal Terrestrial Radio Access (E-UTRA) in early drafts of 3GPP LTE. 3GPP LTE Release-10 introduces to the standard several LTE Advanced (LTE-A) features like carrier aggregation, uplink (UL) Single User Multiple Input Multiple Output (SU-MIMO), relay nodes, and the like, aiming to provide a considerable peak data rate increase.

A downlink (DL), which is a unidirectional communications link from a communications controller (commonly referred to as a base station, a NodeB, an enhanced NodeB, a controller, a cell, a macro cell a low power cell, and the like) to a communications device (such as a relay node, or a mobile station, also commonly referred to as a User Equipment, user, subscriber, terminal, and the like), includes several control channels. The control channels include a Physical Downlink Control Channel (PDCCH) that carries, among other information, the DL allocation information and UL allocation grants for the communications device. While the Physical Control Format Indicator Channel (PCFICH) is used to signal the length of the PDCCH. The Physical Hybrid ARQ Indicator Channel (PHICH) used to carry the acknowledgments from the uplink transmissions. The Physical Downlink Shared Channel (PDSCH) is used for L1 transport data transmission. Supported modulation formats on the PDSCH are QPSK, 16QAM and 64QAM. The Physical Multicast Channel (PMCH) is used for broadcast transmission using a Single Frequency Network. The Physical Broadcast Channel (PBCH) is used to broadcast the basic system information within the cell.

SUMMARY OF THE INVENTION

Example embodiments of the present invention which provide a system and method for resource management in a communications system.

In accordance with an example embodiment of the present invention, a method for operating a communications controller is provided. The method includes defining a positive integer quantity of resource element groups from a resource block with a positive integer number N resource elements in each resource element group, the resource block having a total number of resource elements, the total number of resource elements consisting of available resource elements and reserved resource elements, assigning a plurality of available resource elements to fill in each of the positive integer quantity of resource element groups with N available resource elements in each resource element group, blocking any unassigned available resource elements from being used in a resource element group, interleaving a plurality of control messages onto the positive integer quantity of resource element groups, and transmitting the positive integer quantity of resource element groups.

In accordance with another example embodiment of the present invention, a method for operating a communications controller is provided. The method includes defining a positive integer quantity of resource element groups with a positive integer number N resource elements in each resource element group, determining a positive integer quantity of resource blocks necessary for providing sufficient available resource elements to fill each resource element group with N available resource elements, a total number of resource elements across the positive integer quantity of resource blocks consisting of available resource elements and reserved resource elements prohibited from being assigned to a resource element group, assigning all available resource elements to the positive integer quantity of resource element groups, interleaving a plurality of control messages onto the positive integer quantity of resource element groups, and transmitting the positive integer quantity of resource element groups.

In accordance with another example embodiment of the present invention, a method for operating a communications device is provided. The method includes receiving a resource block including a plurality of control messages interleaved within a positive integer quantity of resource element groups defined from the resource block with a positive integer number N resource elements in each resource element group, the resource block having a total number of resource elements, the total number of resource elements consisting of available resource elements, reserved resource elements, and blocked available resource elements remaining after assigning a plurality of available resource elements to fill in each of the positive integer quantity of resource element groups with N available resource elements in each resource element group, de-interleaving the plurality of control messages from the received resource block, and selecting a control message for the communications device from the plurality of control messages.

In accordance with another example embodiment of the present invention, a method for operating a communications device is provided. The method includes receiving a positive integer quantity of resource blocks including a plurality of control messages interleaved within a positive integer quantity of resource element groups with a positive integer N resource elements in each resource element group, the positive integer quantity of resource blocks providing sufficient available resource elements to fill each resource element group with N available resource elements, a total number of resource elements across the positive integer quantity of resource blocks consisting of available resource elements and reserved resource elements prohibited from being assigned to a resource element group, de-interleaving the plurality of control messages from the received positive integer quantity of resource blocks, and selecting a control message for the communications device from the plurality of control messages.

In accordance with another example embodiment of the present invention, a communications controller is provided. The communications controller includes a processor, and a transmitter coupled to the processor. The processor defines a positive integer quantity of resource element groups with a positive integer number N resource elements in each resource element group, and determines a positive integer quantity of resource blocks necessary for providing sufficient available resource elements to fill each resource element group with N available resource elements, a total number of resource elements across the positive integer quantity of resource blocks consisting of available resource elements and reserved resource elements prohibited from being assigned to a resource element group. The processor also assigns all available resource elements to the positive integer quantity of resource element groups, and interleaves a plurality of control messages onto the positive integer quantity of resource element groups. The transmitter transmits the positive integer quantity of resource element groups.

In accordance with another example embodiment of the present invention, a communications device is provided. The communications device includes a receiver, and a processor coupled to the receiver. The receiver receives a resource block including a plurality of control messages interleaved within a positive integer quantity of resource element groups defined from the resource block with a positive integer number N resource elements in each resource element group, the resource block having a total number of resource elements, the total number of resource elements consisting of available resource elements, reserved resource elements, and blocked available resource elements remaining after assigning a plurality of available resource elements to fill in each of the positive integer quantity of resource element groups with N available resource elements in each resource element group. The processor de-interleaves the plurality of control messages from the received resource block, and selects a control message for the communications device from the plurality of control messages.

One advantage of example embodiments disclosed herein is that complete resource element groups (REG) are defined for a variety of overhead configurations, including resource elements reserved for reference signals, muted resource elements, and the like. Therefore, defining and using REGs are simpler.

A further advantage of example embodiments is that a consistent definition of REGs is used, thereby maintaining consistency with early 3GPP LTE releases.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to improving communications performance by interleaving multiple messages together. The interleaving of the multiple transmissions may be based on groups of four resource elements, each referred to as a resource element group (REG). The REGs are defined over multiple resource blocks to ensure that there are an integer number of REGs after excluding resource elements that are reserved for transmitting reference signals, muted resources elements, prevented from use in a REG, and the like. In another embodiment, the REGS are defined over a single resource block with resource elements that are prohibited from being used in REGs added to ensure that there an integer number of REGs. For example, the REGs may be defined over two resource blocks to ensure that an integer number of REGs are available for interleaving transmissions even when resource elements are or are not reserved for transmitting reference signals, zero power reference signals, and the like.

The present invention will be described with respect to example embodiments in a specific context, namely a 3GPP LTE compliant communications system. The invention may also be applied, however, to other standards compliant communications systems, such as IEEE 802.16, WiMAX, and the like, or non-standards compliant communications systems that support interleaving transmissions where the transmissions are interleaved based on interleaving resources that are larger than a fundamental transmission resource.

Figure 1A:
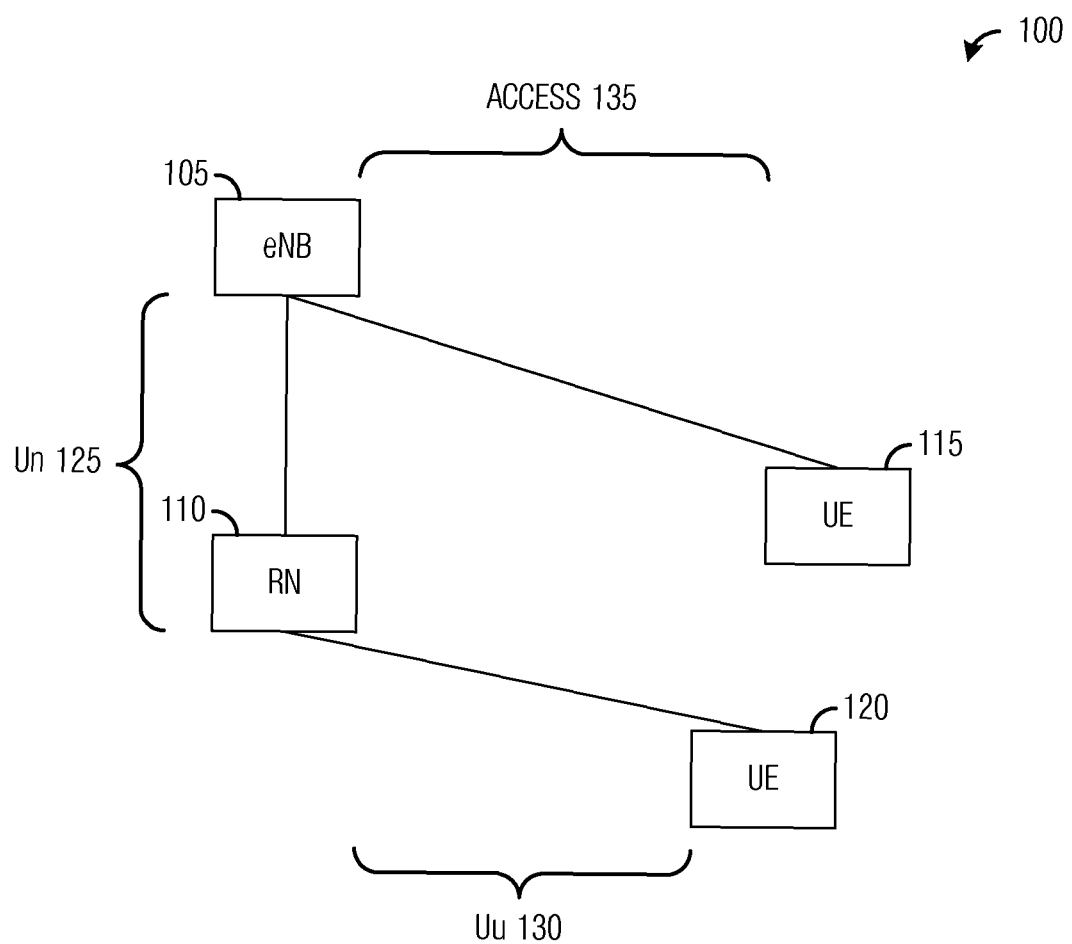
FIG. 1a illustrates an example communications system according to example embodiments described herein.

FIG. 1a illustrates a communications system 100. Communications system 100 includes an enhanced NodeB (eNB) 105, a relay node (RN) 110, a first User Equipment (UE) 115, and a second UE 120. While it is understood that communications systems may employ multiple eNBs capable of communicating with a number of UEs, only one eNB, two UEs, and one RN are illustrated for simplicity.

A RN is considered as a tool to improve, e.g., the coverage area of high data rate communications, group mobility, temporary network deployment, the cell-edge throughput, and/or to provide coverage in new areas. The RN is wirelessly connected to a wireless communications network via an eNB, such as eNB 105.

UE 115 and UE 120 may be a communications device that may allow an operator to connect to a service, such as voice service, data service, multimedia service, and the like. As shown in FIG. 1, eNB 105 has allocated some resources to RN 110, which in turn, may allocate some resources (provided by eNB 105) to UE 120. eNB 105 may also directly communicate with UEs. For example, eNB 105 directly allocates resources to UE 115. Communications between eNB 105 and RN 110 may be made over a communications link (uplink and/or downlink directions) referred to as a Un link 120 or a wireless backhaul link, while communications between RN 110 and UE 120 may be made over a communications link (uplink and/or downlink directions) referred to as a Uu link 130 or an access link. Communications between eNB 105 and UE 115 may be made over communications link referred to as access link 135.

Figure 1B:
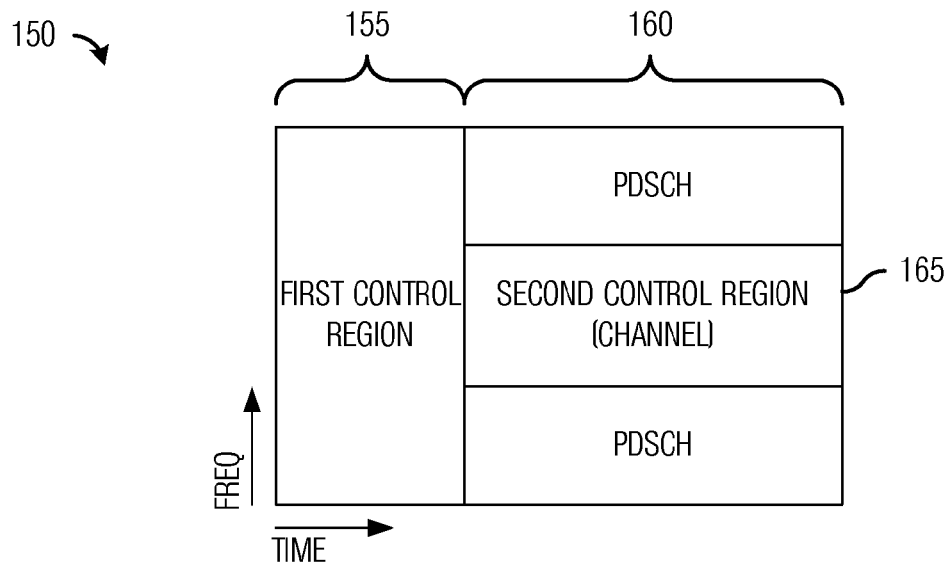
FIG. 1b illustrates an example subframe according to example embodiments described herein.

FIG. 1b illustrates a subframe 150. Subframe 150 comprises a first control region 155 and a data region 160. Subframe 150 shows an example for a multicarrier modulation system. Subframe 150 may also be referred to as a resource block (RB) or a resource block pair. As discussed above, the first control region 155 may include control signaling, such as a Physical Downlink Control Channel (PDCCH), while data region 160 may include data (shown as a Physical Downlink Shared Channel (PDSCH) as well as control signaling, which may include the Relay-Physical Downlink Control Channel (R-PDCCH), as well as new control channels, such as a User Physical Hybrid Automatic Repeat Requested Indicator Channel (U-PHICH) or a User Physical Downlink Control Channel (U-PDCCH). Note that the representation on FIG. 1b is in the logical domain, and may not necessarily map with actual allocated physical resources.

First control region 155 may also be called a PDCCH control region. The control channels are located in a second control region 165, which may be inside data region 160. Second control region 165 may comprise the R-PDCCH, as well as an extension for UEs (also called the U-PDCCH control region) as well as frequency domain extensions of the PDCCH, such as extended PDCCH (E-PDCCH or ePD-CCH). As shown in FIG. 1b, second control region 165 is located in data region 160, while PDCCH is located in first control region 155.

Although the discussion of the example embodiments focuses on the R-PDCCH, the example embodiments may be operable with other control channels, such as the U-PDCCH, frequency domain extensions of the PDCCH, and the like. Therefore, the discussion of the R-PDCCH should not be construed as being limiting to either the scope or the spirit of the example embodiments.

Generally the data region can start from OFDM symbol 1, 2, 3, or 4, and the second control region can also start from these values. When the data region can start from OFDM symbol zero, the control channel in the data region can then also start from OFDM symbol zero, in this situation, the first control region may disappear.

The representation of the various channels and regions in FIG. 1b is logical in nature with no direct relationship to an actual mapping of specific physical resources. In particular, the resources comprising second control region 165 may be distributed in frequency and are not restricted to be contiguous in frequency. Second control region 165 may also be time multiplexed with data, and for instance, may occupy only the first or the second slot or both the first and the second slot of a subframe. In addition, second control region 165 may not necessarily start immediately after first control region 155, but may be offset by one or more symbols. Second control region 165 may consist of Physical RBs (PRBs) or Virtual RBs (VRBs), either localized or distributed.

Figure 1C:
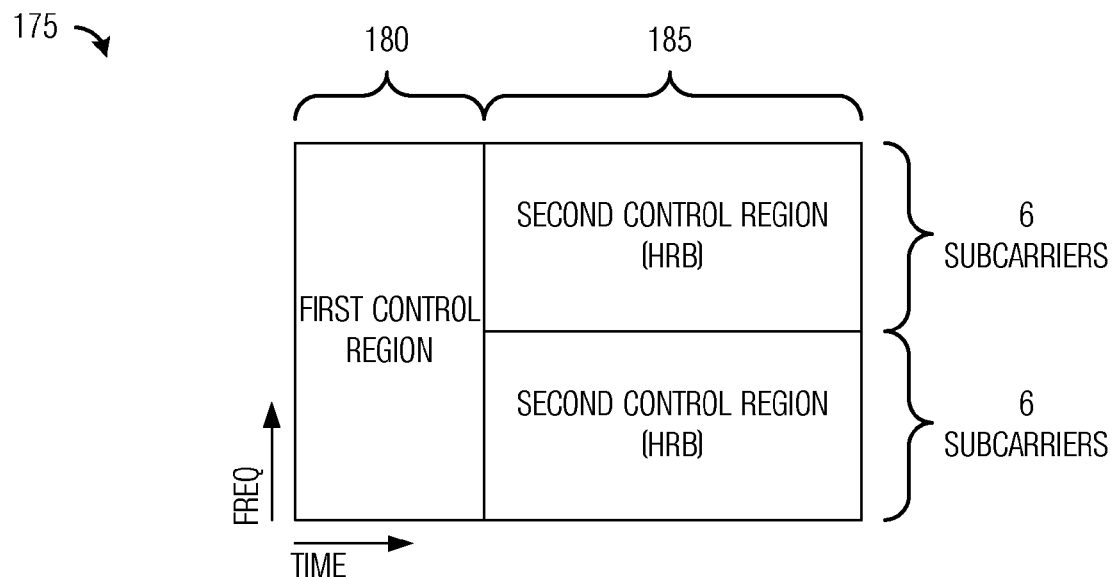
FIG. 1c illustrates an example subframe with two second control regions according to example embodiments described herein.

FIG. 1c illustrates a subframe 175. Subframe 175 comprises a first control region 180 and a data control region 185. Subframe 150 may also be referred to as a RB pair. Data region 185 may differ from data region 160 shown in FIG. 160 in that data region 185 is partitioned into two second control regions, which may be referred to as half of a RB (HRB). Data region 185 may consist of half of a Physical RB (HPRB) or half of a Virtual RB (HVRB), either localized or distributed. A HRB can be half of a RB or RB pair. A HPRB can be half of a PRB or half of a PRB pair, and a HVRB can be half of a VRB or half of a VRB pair. In a manner similar to how a RB covers an entire slot, and a RB pair covers an entire subframe in the time domain, the HRB, HPRB, and/or HVRB can cover one slot or the whole subframe in the time domain (i.e., two HRB pair, two HPRB pair, and/or two HVRB pair).

When data region 185 is referred to as comprising a HRB, a HPRB, or a HVRB, then data region 185 already excludes first control region 185. Although data region 185 is shown in FIG. 1c as being partitioned into two equal second control regions, data region 185 may be partitioned into any number of second control regions and the second control regions need not be equal in size. Furthermore, data region 185 may also include data, e.g., one of the HRBs is used for control, and anther HRB is used for data.

In 3GPP LTE compliant communications systems, R-PDCCHs (as well as other control channels) can be either cross interleaved (or simply interleaved) or not cross interleaved (or simply not interleaved). With cross interleaving, a set of two or more R-PDCCHs may be multiplexed together. Each of the R-PDCCHs in the set is transmitted on an aggregation of one or several consecutive control channel elements (CCEs), where a control channel element corresponds to a number of, for example, nine, resource element groups (REG). The REGs for various R-PDCCHs are multiplexed and cross interleaved together. With no cross interleaving, each R-PDCCH is transmitted separately on the assigned resources for that R-PDCCH. It is noted that the terms cross interleaving and interleaving may be used interchangeably herein.

On a Un link (for example, Un link 120), a RN (e.g., RN 110) may be informed by an eNB (such as eNB 105) about transmissions using a R-PDCCH. Transmissions to multiple users in the R-PDCCH may be interleaved (e.g., mode 1-1) or non-interleaved. For interleaved transmissions, an interleaver similar to an interleaver used for a PDCCH in 3GPP LTE Release-8 is used. In particular, an interleaving resource defined as a REG is used. A single REG consists of four resource elements (RE) of a single symbol in a single resource block (RB), for example.

However, unlike a PDCCH, which is transmitted in a control region of a transmission subframe (e.g., first control region 155), the R-PDCCH is transmitted in a data region (for example, data region 160) of the transmission subframe and may be used to also transmit reference signals, such as a Demodulation Reference Signal (DMRS), Channel State Information Reference Signal (CSI-RS), muted CSI-RS, unmuted CSI-RS, and the like, which consume REs.

Therefore, the definition of a REG for the R-PDCCH is not as clear cut as the definition of a REG for the PDCCH. In particular, the overhead of the DMRS and the CSI-RS needs to be eliminated from the RB in the definition of a REG. Furthermore, some REs need to be muted (muting can mean zero or reduced power transmission) on some antenna port configurations. When the REs that are to be muted are eliminated, the number of REs in a RB (or in a symbol of a RB) available for interleaving is not always a multiple of four. Hence, there may be a non-integer number of REGs in a RB, thus making the definition of a REG not straightforward. So, there is a need for a system and method for resource management in a communications system.

Figure 2:
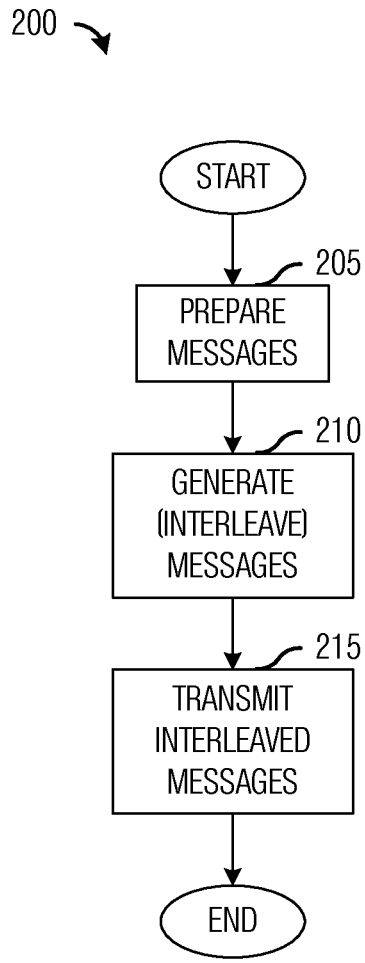
FIG. 2 illustrates an example flow diagram of communications controller operations in transmitting control messages according to example embodiments described herein.

FIG. 2 illustrates a flow diagram of communications controller operations 200 in transmitting control messages. Communications controller operations 200 may be indicative of operations occurring in a communications controller, such as an eNB, a low power node, and the like, as the communications controller transmits control messages to recipients, such as RNs, UEs, and the like, wherein the messages are interleaved. Communications controller operations 200 may also be indicative of operations occurring in a communications controller transmitting control messages to RNs. Communications controller operations 200 may apply to the transmission of control messages, such as R-PDCCHs, U-PHICHs, U-PDCCHs, E-PDCCH, ePDCCH, and the like.

Communications controller operations 200 may begin with the communications controller preparing control messages for transmission (block 205). For discussion purposes, consider a situation wherein a communications controller is transmitting control messages, such as R-PDCCHs, to RNs. Although the discussion focuses on the transmitting of R-PDCCHs to RNs, the example embodiments discussed herein may be applicable to other types of control messages (such as U-PHICHs, U-PDCCHs, E-PDCCH, ePDCCH, and the like) transmitted to other communications devices, such as UEs. Therefore, the discussion of R-PDCCHs and RNs should not be construed as being limiting to either the scope or the spirit of the example embodiments.

In general, the preparation of control messages for transmission may involve multiple operations, including, but not limited to: generating control data, selection of a modulation and coding scheme (MCS) (as well as an aggregation level if needed), and encoding.

Typically, there is a separate R-PDCCH for each RN coupled to the communications controller. According to an example embodiment, control data to be included in an R-PDCCH may include resource assignment, MCS information, Hybrid Automatic Repeat Request (HARQ) information, and the like.

The communications controller may select a MCS and/or aggregation level for each R-PDCCH. The communications controller may select a MCS for each R-PDCCH in accordance with a set of selection criteria. Possible modulation techniques may include QPSK, 16-QAM, 64-QAM, or any other modulation technique. The coding rate selected may be chosen, depending which modulation technique is used, so that the RN may receive its R-PDCCH with a reasonable probability of successful decoding. The aggregation level, which specifies allocated bandwidth for the R-PDCCH, may also impact MCS. In addition, the communications controller may select to use spatial multiplexing. The MCS and/or the aggregation level selected for the various RNs may be different for each RN, identical the RNs, or a combination thereof.

Examples of the set of selection criteria may include amount of control data to be transmitted, amount of network resources available per R-PDCCH, operating environment, communications system load, a quality of the communications channel between the eNB and the RNs, and the like.

With the MCS and/or the aggregation level selected for each RN, the communications controller may encode each R-PDCCH in accordance with its selected MCS and/or selected aggregation level. However, the encoding may also be performed in accordance to other factors, including permissible codes, data rates, and the like.

With the control messages prepared, the communications controller may generate the control messages (block 210). Since there are multiple control messages, the generating of the control messages may include the communications controller processing the multiple control messages (e.g., the multiple R-PDCCHs), which may involve the communications controller interleaving the multiple R-PDCCHs or not interleaving the multiple R-PDCCHs.

In general, interleaving the multiple R-PDCCHs may include the communications controller assigning each R-PDCCHs of a subset of the multiple R-PDCCHs to one or more REGs of one or more RBs and then placing the assigned R-PDCCHs into the REs of the REGs. The assigning of the R-PDCCHs to the REGs may be based on an interleaving rule or an interleaving function, which may assign the R-PDCCHs with intent in spreading out the information in the R-PDCCHs to help improve tolerance to errors, frequency diversity, and the like. Interleaving (assigning and then placing) the multiple R-PDCCHs may also be referred to as mapping the multiple R-PDCCHs based on the interleaving rule.

For discussion purposes, considering a situation wherein the communications controller interleaves the multiple R-PDCCHs. As discussed previously, each of the R-PDCCHs may be interleaved on a REG (a group of four REs, for example) basis, wherein an R-PDCCH be assigned to one or more REGs of one or more RBs. The communications controller may assign the R-PDCCHs to the REGs until all of the R-PDCCHs have been assigned or all of the REGs available for use have been assigned.

In some situations, a R-PDCCH may be larger (in terms of information content) than the data capacity of a single REG. In such a situation, the R-PDCCH may be partitioned into multiple units, which may then be assigned to a REG. Generally, the units may be the size (in terms of information capacity) of a REG or as close to the size of a REG as possible. Furthermore, if a R-PDCCH is not an integer multiple of a REG in size, then the R-PDCCH may be partitioned into as many REG sized units as possible with one unit that is not REG sized.

The REGs that are available for the communications controller to assign to the transmission of the R-PDCCHs may be defined from REs of RBs based on rules, commonly referred to as principles. In general, REGs may be defined from a plurality of REs of RBs that are available for use to transmit the R-PDCCHs, where a RB comprises a number of REs, some of which may be available for use to transmit the R-PDCCHs and some of which may not be available for use to transmit the R-PDCCHs. As an example, some REs may be reserved for transmitting CRS, CSI-RS, muted CSI-RS, and the like, and may not be used to transmit the R-PDCCHs. Hence, these REs may be prohibited from use in a REG. The reserved REs may be reserved for transmitting these signals (CRS, CSI-RS, muted CSI-RS, and the like) according to a technical standard, such as for compliance to a 3GPP LTE standard.

In order to maximize resource utilization, the REGs may be defined from the REs so that as many of the REs available for use in transmitting the R-PDCCHs are used to form REGs as possible. As an example, REs that are available for transmitting the R-PDCCHs but are not used to define the REGs may remain unused, thereby reducing the overall resource utilization efficiency of the communications system. A detailed discussion of principles used to allocate REGs from REs of RBs is provided below.

The communications controller may perform rate matching as part of generating the control messages. Rate matching may also help to increase network resource utilization so that there is little or no network resource waste. Rate matching may help to ensure that REs of a RB are occupied by matching a rate of the R-PDCCH with the rate of the REs of the RBs, thereby reducing or eliminating resource waste. Rate matching may be optional. According to an example embodiment, rate matching may be performed for the R-PDCCHs on an individual basis.

The communications controller may transmit the interleaved control messages (block 215). The transmitting of the interleaved control messages may include mapping the RBs or REGs to physical resource blocks and then actually transmitting the physical resource blocks. Transmitting the interleaved control messages may also include digital to analog conversion, signal amplification, filtering, and the like.

As discussed above, the definition of a REG from REs of a RB for use in transmitting R-PDCCHs may not be as clear cut as the definition of a REG for use in transmitting PDCCHs since REs that may be used in transmitting R-PDCCHs may also be used for the transmission of DMRS, CSI-RS, muted CSI-RS, and the like, and need to be eliminated from a set of available REs (of a RB or RBs) that may be used to define REGs.

When there is no CSI-RS muting, the REG definition is based on the following principle (referred to herein as principle P):

The REG used for R-PDCCH includes four consecutive REs in one OFDM symbol after discounting the REs used for CRS and CSI-RS, when appropriate.

Figure 3A:
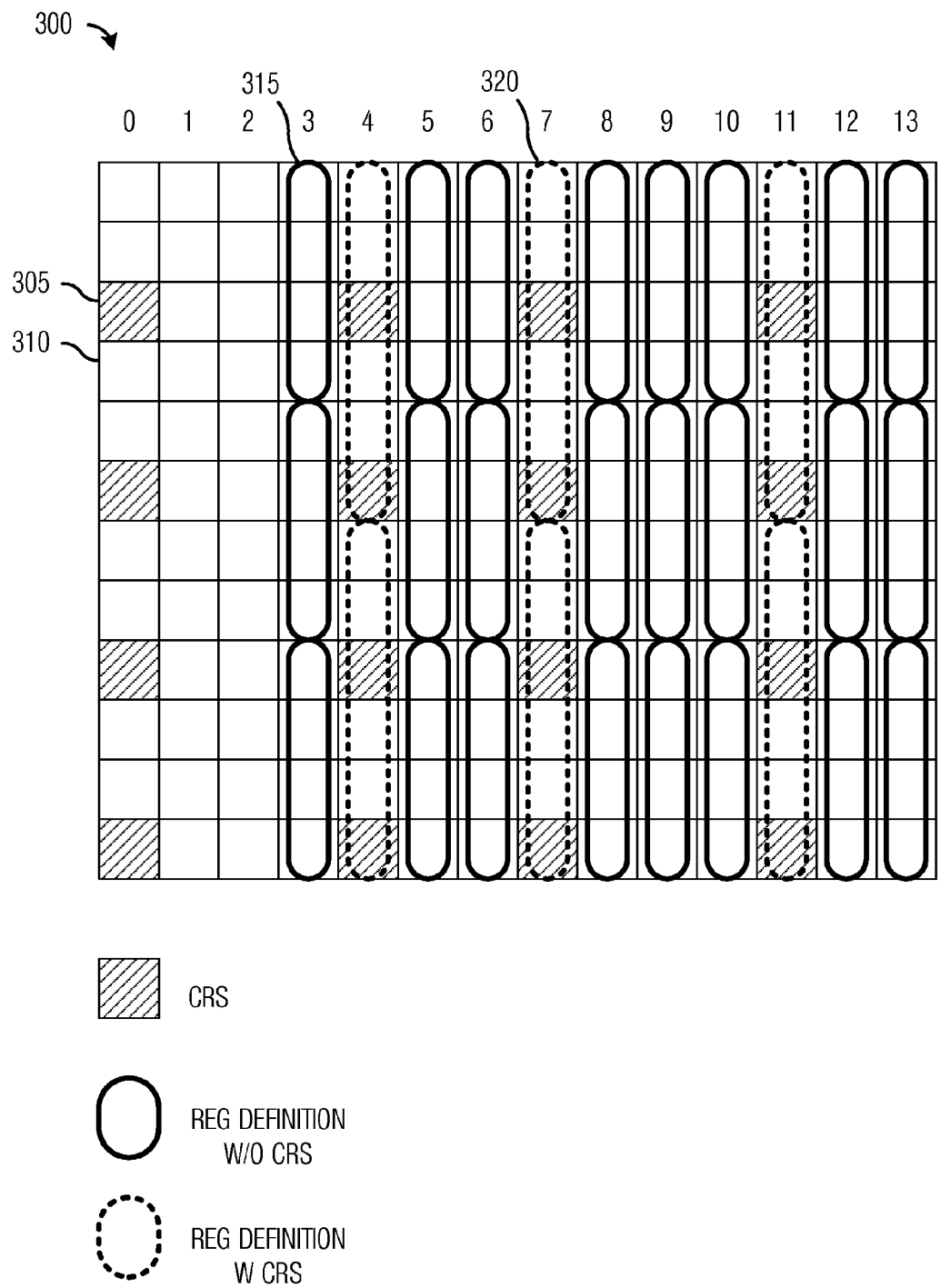
FIG. 3a illustrates an example RB where there are a number of REs reserved for carrying Common Reference Signals according to example embodiments described herein.

FIG. 3a illustrates a RB 300 where there are a number of REs reserved for carrying Common Reference Signals (CRS). RB 300 comprises a block of REs arranged in a 14 by 12 block of REs. Some of the REs may be reserved for carrying a CRS, such as RE 305, while other REs may be used to carry data, such as RE 310. A REG 315 may be specified from four consecutive REs when there are four consecutive REs that may be used to carry data are available, as specified in principle P. A REG 320 may be specified from four non-consecutive REs when a number of REs reserved for carrying a CRS is present. Using the four RE definition of a REG as shown in principle P allows for an integer number of REGs in a RB when there are REs reserved for CRS transmission.

Figure 3B:
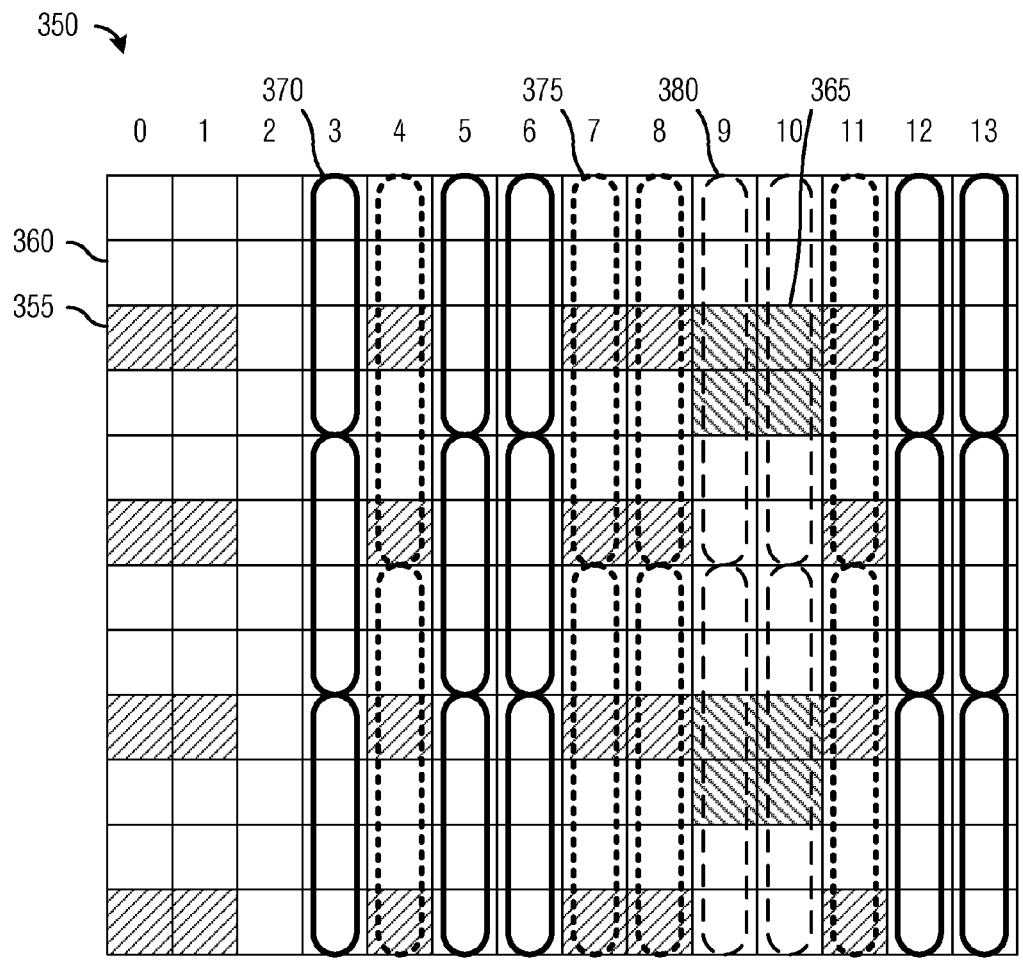
FIG. 3b illustrates an example RB where there are a number of REs reserved for carrying CRS and/or CSI-RS according to example embodiments described herein.
Figure 3B:
Figure 3B:
Figure 3B:
Figure 3B:
Figure 3B:

FIG. 3b illustrates a RB 350 where there are a number of REs reserved for carrying CRS and/or CSI-RS. Some of the REs may be reserved for carrying a CRS, such as RE 355, while other REs may be used to carry data, such as RE 360, and yet other REs may be used to carry CSI-RS, such as RE 365. A REG 370 may be specified from four consecutive REs when there are four consecutive REs that may be used to carry data are available, as specified in principle P. A REG 375 may be defined from four non-consecutive REs when a number of REs reserved for carrying a CRS is present. A REG 380 may be specified from four non-consecutive REs when a number of REs reserved for carrying a CSI-RS is present. Using the four RE definition of a REG as shown in principle P allows for an integer number of REGs in a RB when there are REs reserved for CRS and/or CSI-RS transmission.

Figure 4:
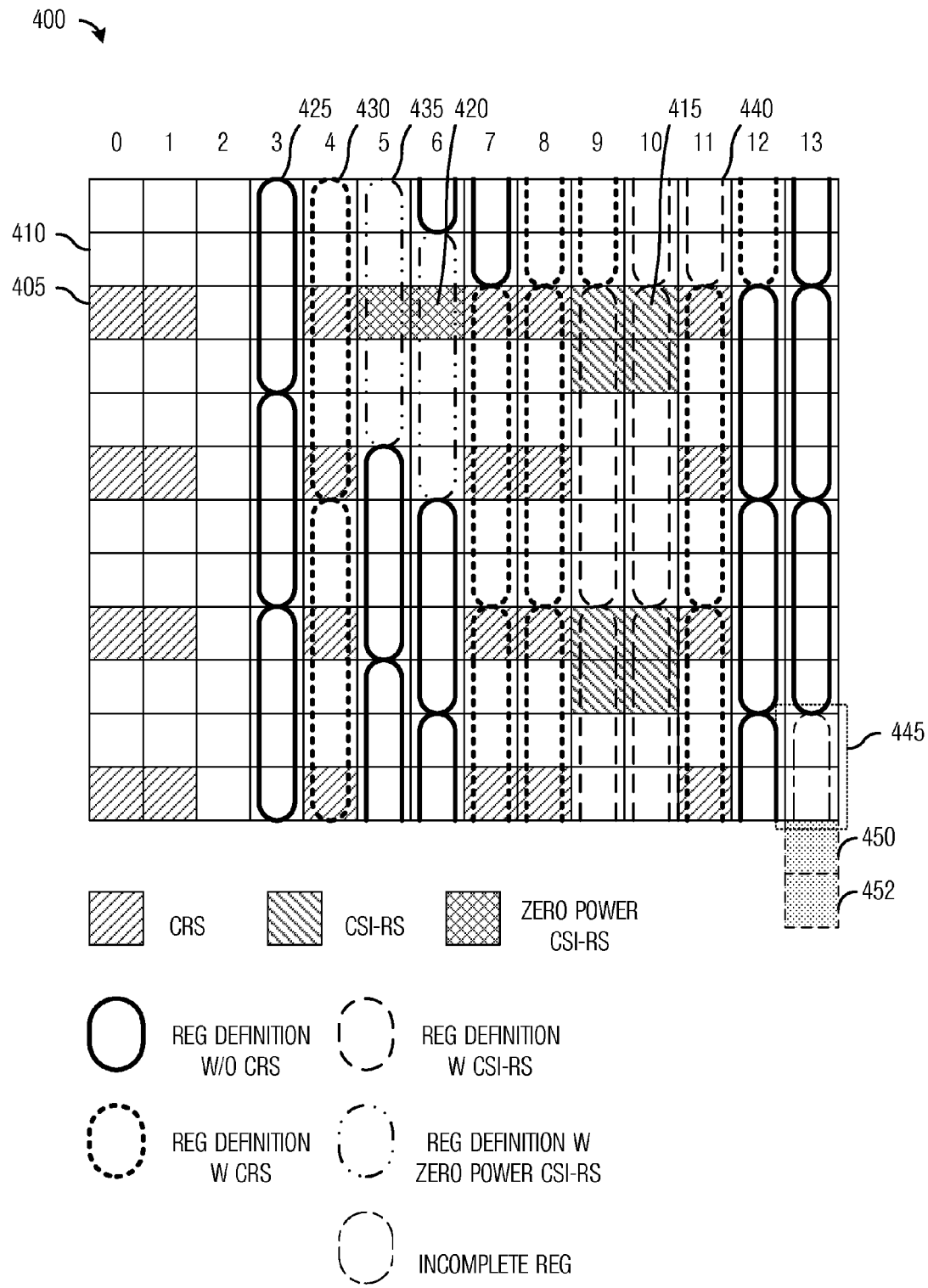
FIG. 4 illustrates an example RB where there are a number of REs reserved for carrying CRS and/or CSI-RS as well as some that are used for muted CSI-RS according to example embodiments described herein.

FIG. 4 illustrates a RB 400 where there are a number of REs reserved for carrying CRS and/or CSI-RS as well as some that are used for muted CSI-RS. Some of the REs may be reserved for carrying a CRS, such as RE 405, while other REs may be used to carry data, such as RE 410, and yet other REs may be used to carry CSI-RS, such as RE 415. While other REs may be used to carry non-muted CSI-RS, such as RE 420. In general, a muted CSI-RS may also be referred to as a zero power CSI-RS, while a non-muted CSI-RS (or simply CSI-RS) may be referred to as a non-zero power CSI-RS. The terminology may be used interchangeably without loss of generality.

In general, a REG may be defined in a column order and if an end of a column is reached before a REG is complete, then REs from the next column are used. As an example, a REG 425 may be specified from four consecutive REs when there are four consecutive REs that may be used to carry data are available, as specified in principle P. Similarly, REG 430 may be specified from four non-consecutive REs when a number of REs reserved for carrying a CRS is present. A REG 435 may be specified from four non-consecutive REs when a number of REs reserved for carrying a muted CSI-RS (zero power CSI-RS) is present. A REG 440, which starts at the bottom of column 10 and continues to the top of column 11, may be specified from four non-consecutive REs when a number of REs reserved for carrying a CSI-RS (non-zero power CSI-RS) is present.

However, utilizing principle P when muted CSI-RS (zero power CSI-RS) are present results in two REs (shown as REs 445) remaining undefined as part of a REG. Hence, the REs 445 may be wasted unless two additional REs (RE 450 and RE 452, for example) are found and defined along with REs 445 to form another REG.

According to an example embodiment, the definition of REGs may be modified so that a REG may be defined over two RBs in order to ensure that all REs are defined as REGs. The definition of a REG over two RBs may be expressed as principle (referred to herein as principle P'):

The REG used for R-PDCCH includes four consecutive REs after discounting the REs used for CRS, non-zero power CSI-RS, and zero power CSI-RS when appropriate. The REGs are defined over two RBs.

Although the discussion focuses on specifying REGs over two RBs, the example embodiments presented herein may be operable with any number of RBs divisible by two, for example, two, four, six, eight, and the like. Therefore, the focus on two RBs should not be construed as being limiting to either the scope or the spirit of the example embodiments.

Figure 5A:
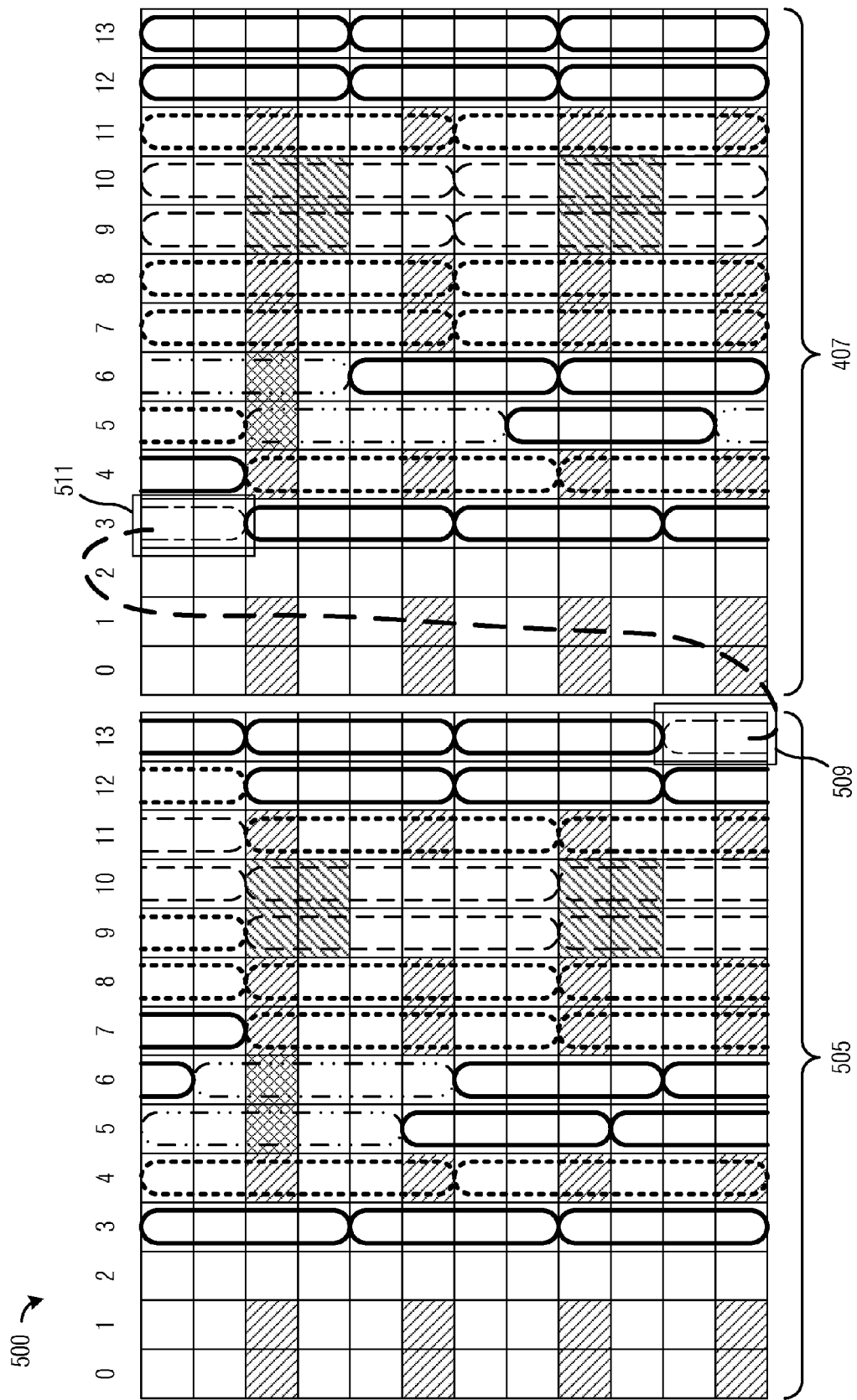
FIGS. 5a-5d illustrate example configurations for specifying REGs from REs over two RBs according to example embodiments described herein.

FIG. 5a illustrates a first configuration 500 for specifying REGs from REs over two RBs. First configuration 500 comprises logically horizontally placing the two RBs (RB 505 and RB 507) together to form a double-wide RB. As an example, if a single RB was a 14 by 12 rectangular array of REs, then the double-wide RB would be a 28 by 12 rectangular array of REs.

Definition of REs into REGs may follow as shown in FIG. 4 (i.e., column order within individual RBs), resulting in two REs being undefined as part of a REG at the end of RB 505 (shown as REs 509). However, by allowing a REG to span two RBs, REs 509 may be combined with two REs in RB 507 (shown as REs 511) to form a REG. The definition of REs into REGs may continue with the remainder of REs in RB 507, resulting in an integer number of REGs and no unused REs.

Figure 5B:
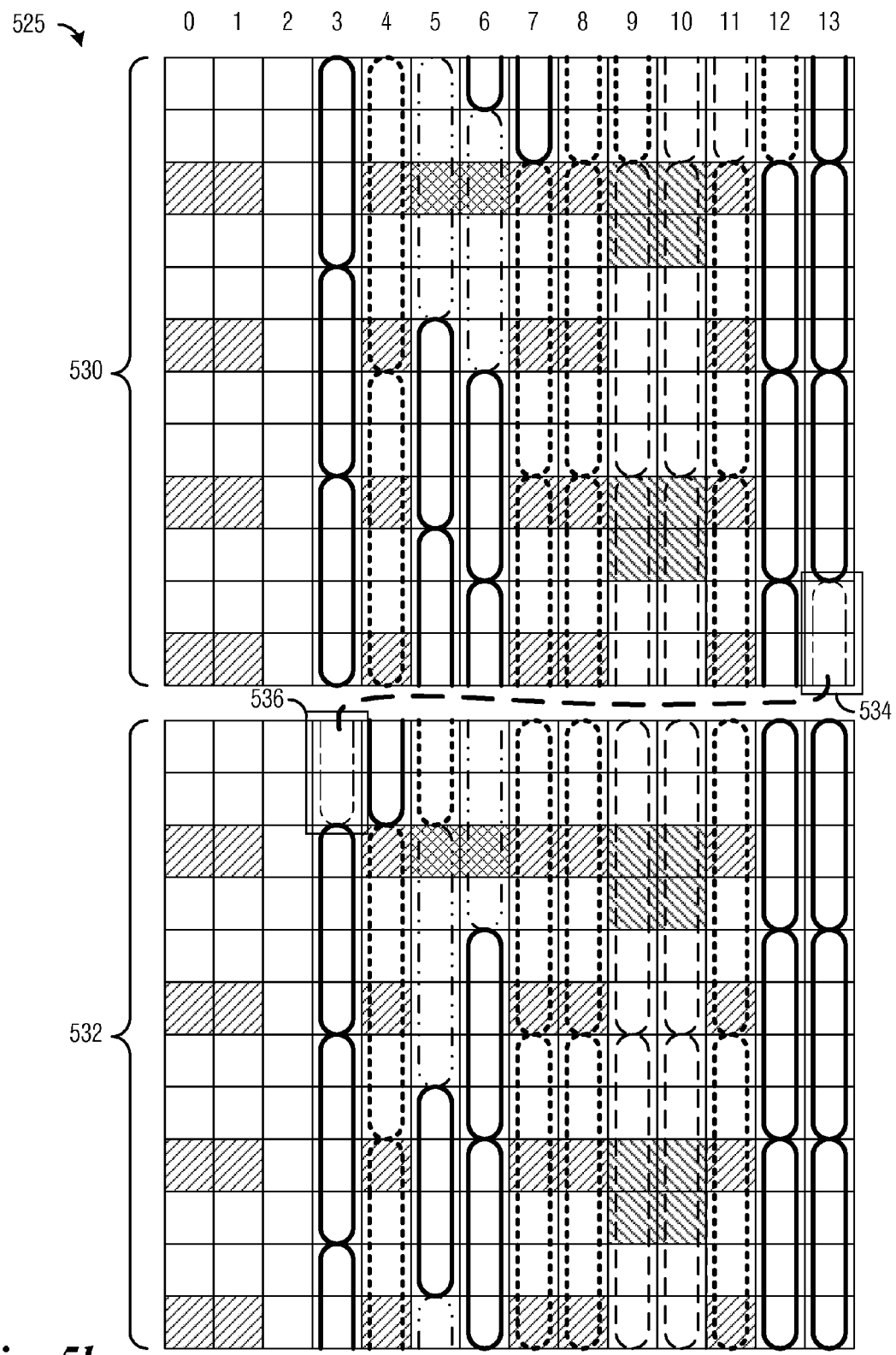

FIG. 5b illustrates a second configuration 525 for specifying REGs from REs over two RBs. Second configuration 525 comprises logically vertically stacking two RBs (RB 530 and RB 532) together to form a double-tall RB. As an example, if a single RB was a 14 by 12 rectangular array of REs, then the double-tall RB would be a 14 by 24 rectangular array of REs.

Definition of REs into REGs may follow as shown in FIG. 4 (i.e., column order within individual RBs), resulting in two REs being undefined as part of a REG at the end of RB 530 (shown as REs 534). However, by allowing a REG to span two RBs, REs 534 may be combined with two REs in RB 532 (shown as REs 536) to form a REG. The definition of REs into REGs may continue with the remainder of REs in RB 532, resulting in an integer number of REGs and no unused REs.

Figure 5C:
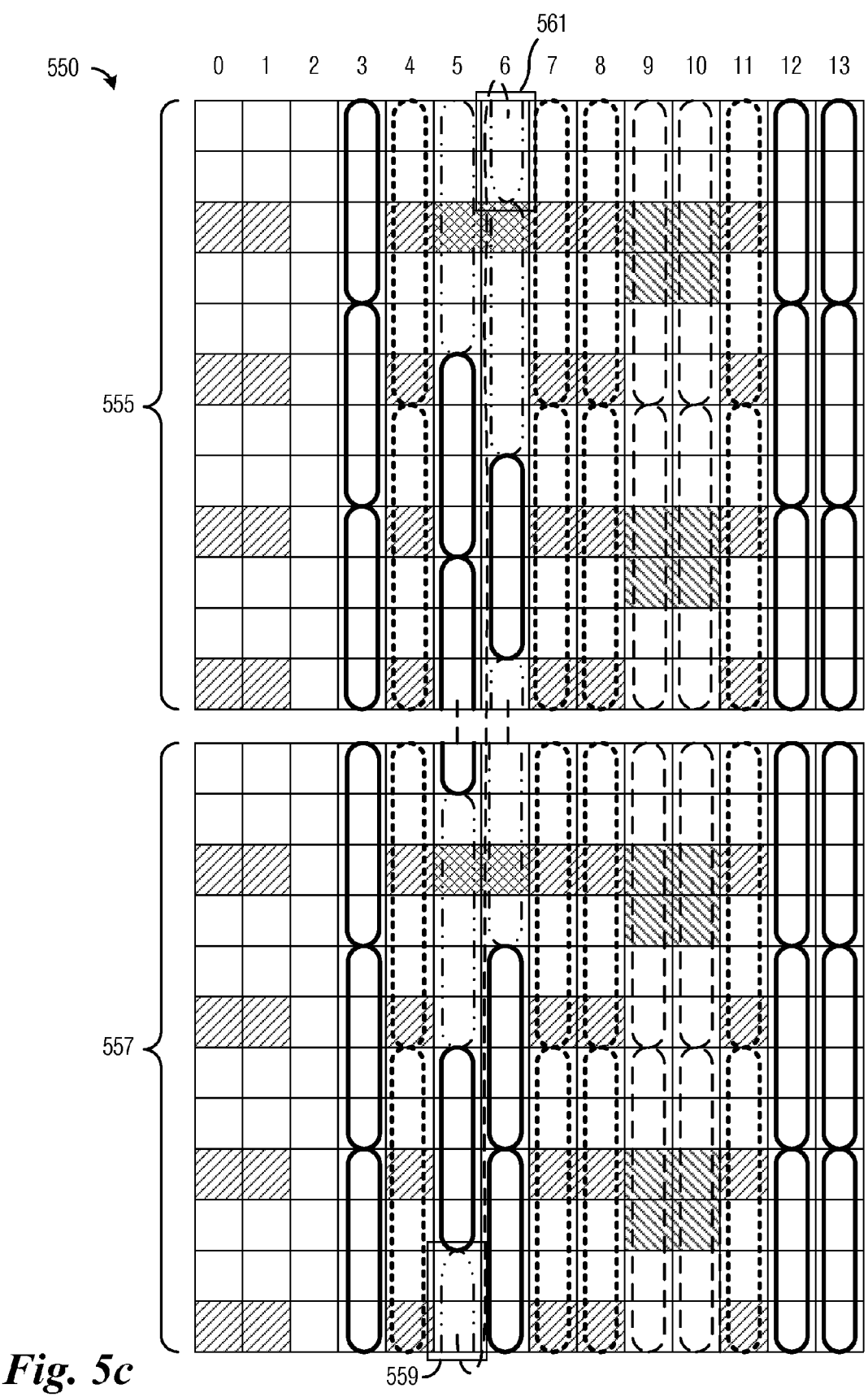

FIG. 5c illustrates a third configuration 550 for specifying REGs from REs over two RBs. Third configuration 550 comprises logically vertically stacking two RBs (RB 555 and RB 557) together to form a double-tall RB. As an example, if a single RB was a 14 by 12 rectangular array of REs, then the double-tall RB would be a 14 by 24 rectangular array of REs.

Definition of REs into REGs may differ from the allocation shown in FIG. 5b. While still defined in column order, the definition of REs into REGs as shown in FIG. 5c spans the two vertically stacked RBs (referred to herein as column order spanning multiple RBs). Instead of defining REs within a single RB into REGs until all of the RBs have been defined as in FIG. 5b, the definition of REs into REGs in FIG. 5c may be performed vertically, crossing RB boundaries as needed. For example, consider column 3 of RB 555 where three REGs may be defined. Then, the next REG defined would be in column 3 of RB 557 rather than in column 4 of RB 555. The ordering sequence for the definition of the REGs may also be referred to as frequency first, time second ordering.

If when defining REs into a REG, the end of a column of a RB is reached, such as in column 5 of RB 555, additional RE(s) of RB 557 may be used as needed to finish defining the REG. Similarly, at the end of column 5 of RB 557, two REs (shown as REs 559) are defined into a REG, leaving the REG short by two REs. The two REs may be defined from the top of column 6 of RB 555 (shown as REs 561). The definition of REs into REGs may continue with the remainder of REs in RB 555 and RB 557, resulting in an integer number of REGs and no unused REs.

Figure 5D:
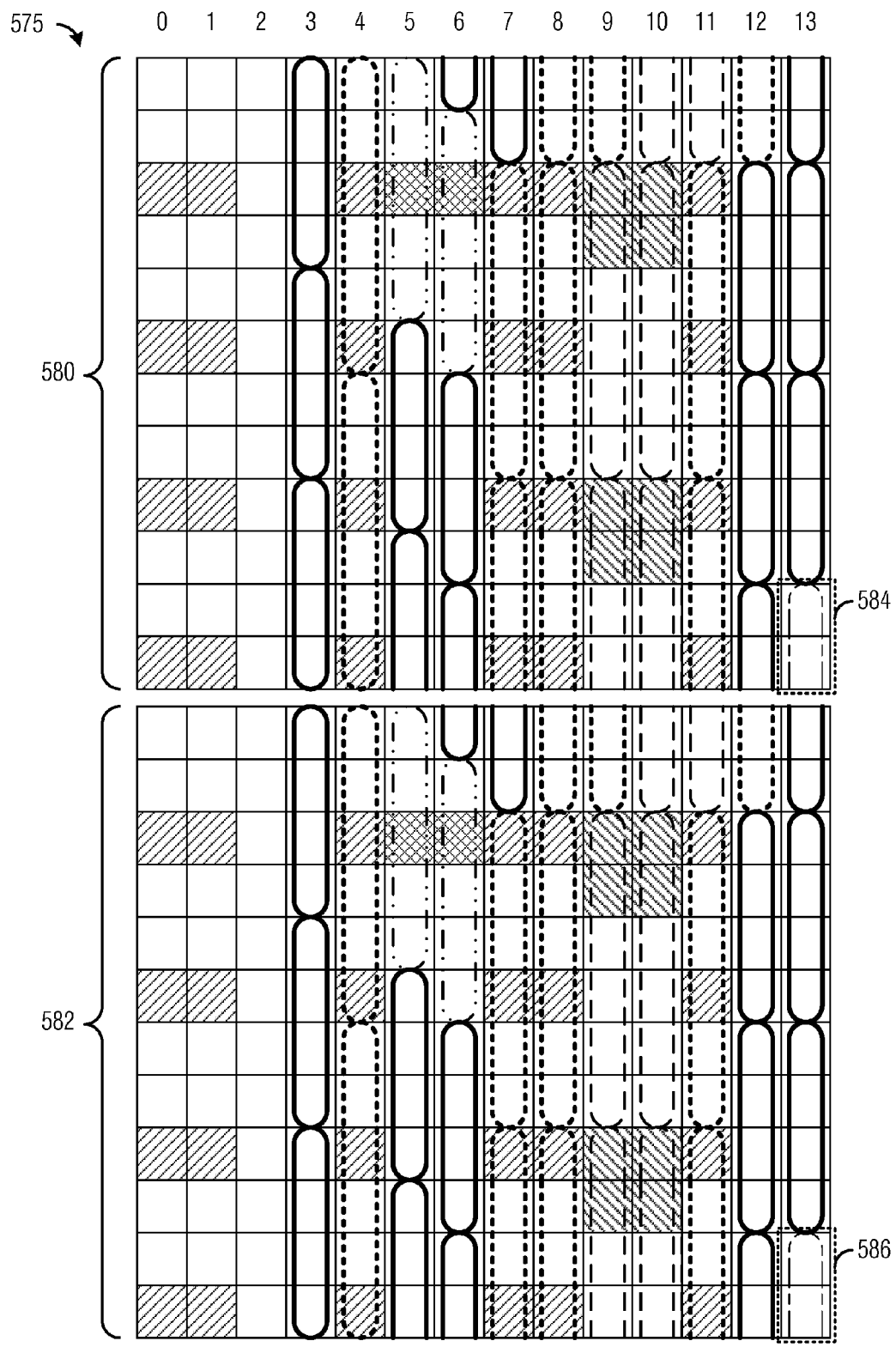

FIG. 5d illustrates a fourth configuration 575 for specifying REGs from REs over two RBs. Fourth configuration 575 comprises two RBs (RB 580 and RB 582) that are not necessarily logically arranged in any particular manner.

Definition of REs into REGs may follow as shown in FIG. 4 (i.e., column order within individual RBs) resulting in two REs being undefined as REGs at the end of RB 580 (shown as REs 584) and two REs being undefined as REGs at the end of RB 582 (shown as REs 586). REs 584 and REs 586 may be referred to as previously undefined REs and may be used to define an additional REG. As an example, REs 584 and REs 586 may then be used to define a single additional REG, resulting in an integer number of REGs and no unused REs.

The following discussion relates to the solution where REGs are defined over 2 RBs. REGs are used for defining the mapping of relay control channels to REs.

A REG is represented by the index pair (k',l') of the RE with the lowest index k in the group with all REs in the group having the same value of l. The set of REs (k,l) in a REG depends on the number of configured CRS, CSI-RS and muted REs, as described below with $k_0 = n_{PRB} \cdot N_{sc}^{RB} \times 2$, $0 \leq n_{PRB} < NR_{RB}^{DL}/2$.

In the first OFDM symbol of the first slot in a subframe the two REGs in physical resource block $n_{PRB}$ consist of REs (k,l=0) with $k=k_0+0$, $k_0+1$, ..., $k_0+5$ and $k=k_0+6$, $k_0+7$, ..., $k_0+11$, respectively.

In the second OFDM symbol of the first slot in a subframe in case of one or two CRS configured, the three REGs in physical resource block $n_{PRB}$ consist of REs (k,l=1) with $k=k_0+0$, $k_0+1$, ..., $k_0+3$, $k=k_0+4$, $k_0+5$, ..., $k_0+7$ and $k=k_0+8$, $k_0+9$, ..., $k_0+11$, respectively.

In the second OFDM symbol of the first slot in a subframe in case of four CRS configured, the two REGs in physical resource block $n_{PRB}$ consist of REs (k,l=1) with $k=k_0+0$, $k_0+1$, ..., $k_0+5$ and $k=k_0+6$, $k_0+7$, ..., $k_0+11$, respectively.

In the third OFDM symbol of the first slot in a subframe, the three REGs in physical resource block $n_{PRB}$ consist of REs (k,l=2) with $k=k_0+0$, $k_0+1$, ..., $k_0+3$, $k=k_0+4$, $k_0+5$, ..., $k_0+7$ and $k=k_0+8$, $k_0+9$, ..., $k_0+11$, respectively.

In the fourth OFDM symbol of the first slot in a subframe in case of normal cyclic prefix, the three REGs in physical resource block $n_{PRB}$ consist of REs (k,l=3) with $k=k_0+0$, $k_0+1$, ..., $k_0+3$, $k=k_0+4$, $k_0+5$, ..., $k_0+7$ and $k=k_0+8$, $k_0+9$, ..., $k_0+11$, respectively.

In the fourth OFDM symbol of the first slot in a subframe in case of extended cyclic prefix, the two REGs in physical resource block $n_{PRB}$ consist of REs (k,l=3) with $k=k_0+0$, $k_0+1$, ..., $k_0+5$ and $k=k_0+6$, $k_0+7$, ..., $k_0+11$, respectively.

Mapping of a symbol-quadruplet $\langle z(i), z(i+1), z(i+2), z(i+3) \rangle$ onto a REG represented by RE (k',l') is may be specified such that elements z(i) are mapped to RE (k,l) of the REG not used for CRS, CSI-RS and muted REs, in increasing order of i and k. It is noted that the muted REs may be used to transmit other zero power signals, such as zero power CRS, and the like, not just zero power CSI-RS.

In case a single CRS is configured, CRS may be assumed to be present on antenna ports 0 and 1 for the purpose of mapping a symbol-quadruplet to a REG, otherwise the number of CRS may be assumed equal to the actual number of antenna ports used for CRS.

In case one or two CSI-RS are configured, CSI-RS may be assumed to be present on antenna ports 15, 16, 17 and 18 for the purpose of mapping a symbol-quadruplet to a REG, otherwise the number of CSI-RS may be assumed equal to the actual number of antenna ports used for CSI-RS.

The UE or relay node may not make any assumptions about REs assumed to be reserved for RS but not used for transmission of a RS.

In OFDM symbols that contain CRS, the six REGs in virtual resource block pair ($n_{PRB}$, $n_{PRB}+1$) consist of REs $k=k_0$, $k_0+1$, ..., $k_0+5$, $k=k_0+6$, $k_0+7$, ..., $k_0+11$, $k=k_0+12$, $k_0+13$, ..., $k_0+17$, $k=k_0+18$, $k_0+19$, ..., $k_0+23$, respectively.

In OFDM symbols that contain CSI-RS and no muted REs, when 8 CSI-RS ports are configured in normal and extended cyclic prefix, the four REGs in virtual resource block pair ($n_{PRB}$, $n_{PRB}+1$) consist of REs $k=k_0$, $k_0+1$, ..., $k_0+5$, $k=k_0+6$, $k_0+7$, ..., $k_0+11$, $k=k_0+12$, $k_0+13$, ..., $k_0+17$, $k=k_0+18$, $k_0+19$, ..., $k_0+23$, respectively, for normal and cyclic prefix.

In OFDM symbols that contain CSI-RS and no muted REs, when 1, 2 or 4 CSI-RS ports are configured, the five REGs in virtual resource block pair ($n_{PRB}$, $n_{PRB}+1$) consist of REs shown in Tables 1 and 2 for normal and extended cyclic prefix, respectively.

TABLE 1

2 or 4 CSI-RS are configured in normal cyclic prefix

| 4-port CSI-RS configuration in normal cyclic prefix | 1-port and 2-port CSI-RS configuration in normal cyclic prefix | REGs in virtual resource block pair ($n_{PRB}$, $n_{PRB}$ + 1) |
|---|---|---|
| 0 | 0, 10 | $k = k_0, k_0 + 1, \ldots, k_0 + 4$ |
|   |       | $k = k_0 + 5, k_0 + 6, \ldots, k_0 + 8$ |
|   |       | $k = k_0 + 9, k_0 + 10, \ldots, k_0 + 13$ |
|   |       | $k = k_0 + 14, k_0 + 15, \ldots, k_0 + 18$ |
|   |       | $k = k_0 + 19, k_0 + 20, \ldots, k_0 + 23$ |
| 1 | 1, 12 | $k = k_0, k_0 + 1, \ldots, k_0 + 3$ |
|   |       | $k = k_0 + 4, k_0 + 5, \ldots, k_0 + 8$ |
|   |       | $k = k_0 + 9, k_0 + 10, \ldots, k_0 + 13$ |
|   |       | $k = k_0 + 14, k_0 + 15, \ldots, k_0 + 18$ |
|   |       | $k = k_0 + 19, k_0 + 20, \ldots, k_0 + 23$ |
| 2 | 2, 14 | |
| 3 | 3, 16 | |
| 4 | 4, 18 | |
| 5 | 5, 11 | $k = k_0, k_0 + 1, \ldots, k_0 + 4$ |
|   |       | $k = k_0 + 5, k_0 + 6, \ldots, k_0 + 9$ |
|   |       | $k = k_0 + 10, k_0 + 11, \ldots, k_0 + 13$ |
|   |       | $k = k_0 + 14, k_0 + 15, \ldots, k_0 + 18$ |
|   |       | $k = k_0 + 19, k_0 + 20, \ldots, k_0 + 23$ |
| 6 | 6, 13 | |
| 7 | 7, 15 | |
| 8 | 8, 17 | |
| 9 | 9, 19 | |
| 20 | 20, 26 | |
| 21 | 21, 27 | |
| 22 | 22, 28 | |
| 23 | 23, 29 | |
| 24 | 24, 30 | |
| 25 | 25, 31 | |

TABLE 2

2 or 4 CSI-RS are configured in extended cyclic prefix

| 4-port CSI-RS configuration in extended cyclic prefix | 2-port CSI-RS configuration in extended cyclic prefix | REGs in virtual resource block pair ($n_{PRB}$, $n_{PRB}$ + 1) |
|---|---|---|
| 0 | 0, 8 | |
| 1 | 1, 9 | |
| 2 | 2, 12 | |
| 3 | 3, 13 | |
| 4 | 4, 10 | |
| 5 | 5, 11 | |
| 6 | 6, 14 | |
| 7 | 7, 15 | |
| 16 | 16, 22 | |
| 17 | 17, 23 | |
| 18 | 18, 24 | |
| 19 | 19, 25 | |
| 20 | 20, 26 | |
| 21 | 21, 27 | |

In OFDM symbols that contain muted REs corresponding to N muting configurations and no CSI-RS, there are 6-N REGs in virtual resource block pair ($n_{PRB}$, $n_{PRB}$+1), where 0<N<7. A REG contains 4 REs that are not muted, and none or some muted REs, such that a REG starts at the subcarrier following the end of the previous REG, and ends with a non-muted RE (unless there are no remaining non-muted REs and in the RB pair but there are remaining muted REs, in which case these are included in the last REG). REGs in virtual resource block pair ($n_{PRB}$, $n_{PRB}$+1) are defined in increasing order of subcarriers, starting from $k=k_0$.

In OFDM symbols that contain both CSI-RS and muted REs corresponding to N muting configurations, when 8 CSI-RS ports are configured, there are 4-N REGs in virtual resource block pair ($n_{PRB}$, $n_{PRB}$+1), where 0<N<5. A REG contains 4 REs that are not muted and not used for CSI-RS, and none or some muted RE, and none or some REs that contain CSI-RS, such that a REG starts at the subcarrier following the end of the previous REG, and ends with a non-muted RE not used for CSI-RS (unless there are no remaining non-muted REs not used for CSI-RS and in the RB pair but there are remaining muted REs or CSI-RS, in which case these are included in the last REG). REGs in virtual resource block pair ($n_{PRB}$, $n_{PRB}$+1) are defined in increasing order of subcarriers, starting from $k=k_0$.

In OFDM symbols that contain both CSI-RS and muted REs corresponding to N muting configurations, when 4 CSI-RS ports are configured, there are 5-N REGs in virtual resource block pair ($n_{PRB}$, $n_{PRB}$+1), where 0<N<6. A REG contains 4 REs that are not muted and not used for CSI-RS, and none or some muted REs, and none or some REs that contain CSI-RS, such that a REG starts at the subcarrier following the end of the previous REG, and ends with a non-muted RE not used for CSI-RS (unless there are no remaining non-muted REs not used for CSI-RS and in the RB pair but there are remaining muted REs or CSI-RS, in which case these are included in the last REG). REGs in virtual resource block pair ($n_{PRB}$, $n_{PRB}$+1) are defined in increasing order of subcarriers, starting from $k=k_0$.

In OFDM symbols that contain both CSI-RS and muted REs corresponding to N muting configurations, when one or two CSI-RS ports are configured, there are 5-N REGs in virtual resource block pair ($n_{PRB}$, $n_{PRB}$+1), where 0<N<6. Four CSI-RS ports may be assumed to be present on antenna ports 15, 16, 17 and 18, corresponding to the 4-port CSI-RS configuration which contains the configured CSI-RS configuration with one or two ports.

For reference, the RAN1#62bis agreement on CSI-RS configurations will be discussed. CSI-RS configuration to (k',l') indices are shown below. CSI-RS patterns were agreed based on 3GPP R1-104263.

TABLE 6.10.5.2-1

Mapping from CSI configuration to (k', l') for normal cyclic prefix.

| | | Number of CSI-RS configured | | | | | |
|---|---|---|---|---|---|---|---|
| | | 2 | | 4 | | 8 | |
| | CSI Configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |

TABLE 6.10.5.2-1-continued

Mapping from CSI configuration to (k', l') for normal cyclic prefix.

|  | CSI Configuration | Number of CSI-RS configured | | | | | |
|---|---|---|---|---|---|---|---|
|  |  | 2 | | 4 | | 8 | |
|  |  | (k', l') | $n_s$ mod 2 | (k', l') | $n_s$ mod 2 | (k', l') | $n_s$ mod 2 |
|  | 6 | (10, 2) | 1 | (10, 2) | 1 | | |
|  | 7 | (8, 2) | 1 | (8, 2) | 1 | | |
|  | 8 | (6, 2) | 1 | (6, 2) | 1 | | |
|  | 9 | (8, 5) | 1 | (8, 5) | 1 | | |
|  | 10 | (3, 5) | 0 | | | | |
|  | 11 | (2, 5) | 0 | | | | |
|  | 12 | (5, 2) | 1 | | | | |
|  | 13 | (4, 2) | 1 | | | | |
|  | 14 | (3, 2) | 1 | | | | |
|  | 15 | (2, 2) | 1 | | | | |
|  | 16 | (1, 2) | 1 | | | | |
|  | 17 | (0, 2) | 1 | | | | |
|  | 18 | (3, 5) | 1 | | | | |
|  | 19 | (2, 5) | 1 | | | | |
| Frame | 20 | (11, 1) | 1 | (11, 1) | 1 | (11, 1) | 1 |
| structure | 21 | (9, 1) | 1 | (9, 1) | 1 | (9, 1) | 1 |
| type | 22 | (7, 1) | 1 | (7, 1) | 1 | (7, 1) | 1 |
| 2 only | 23 | (10, 1) | 1 | (10, 1) | 1 | | |
|  | 24 | (8, 1) | 1 | (8, 1) | 1 | | |
|  | 25 | (6, 1) | 1 | (6, 1) | 1 | | |
|  | 26 | (5, 1) | 1 | | | | |
|  | 27 | (4, 1) | 1 | | | | |
|  | 28 | (3, 1) | 1 | | | | |
|  | 29 | (2, 1) | 1 | | | | |
|  | 30 | (1, 1) | 1 | | | | |
|  | 31 | (0, 1) | 1 | | | | |

TABLE 6.10.5.2-2

Mapping from CSI configuration to (k', l') for extended cyclic prefix.

|  | CSI Configuration | Number of CSI-RS configured | | | | | |
|---|---|---|---|---|---|---|---|
|  |  | 2 | | 4 | | 8 | |
|  |  | (k', l') | $n_s$ mod 2 | (k', l') | $n_s$ mod 2 | (k', l') | $n_s$ mod 2 |
| Frame | 0 | (11, 4) | 0 | (11, 4) | 0 | (11, 4) | 0 |
| structure | 1 | (9, 4) | 0 | (9, 4) | 0 | (9, 4) | 0 |
| type | 2 | (10, 4) | 1 | (10, 4) | 1 | (10, 4) | 1 |
| 1 and 2 | 3 | (9, 4) | 1 | (9, 4) | 1 | (9, 4) | 1 |
|  | 4 | (5, 4) | 0 | (5, 4) | 0 | | |
|  | 5 | (3, 4) | 0 | (3, 4) | 0 | | |
|  | 6 | (4, 4) | 1 | (4, 4) | 1 | | |
|  | 7 | (3, 4) | 1 | (3, 4) | 1 | | |
|  | 8 | (8, 4) | 0 | | | | |
|  | 9 | (6, 4) | 0 | | | | |
|  | 10 | (2, 4) | 0 | | | | |
|  | 11 | (0, 4) | 0 | | | | |
|  | 12 | (7, 4) | 1 | | | | |
|  | 13 | (6, 4) | 1 | | | | |
|  | 14 | (1, 4) | 1 | | | | |
|  | 15 | (0, 4) | 1 | | | | |
| Frame | 16 | (11, 1) | 1 | (11, 1) | 1 | (11, 1) | 1 |
| structure | 17 | (10, 1) | 1 | (10, 1) | 1 | (10, 1) | 1 |
| type | 18 | (9, 1) | 1 | (9, 1) | 1 | (9, 1) | 1 |
| 2 only | 19 | (5, 1) | 1 | (5, 1) | 1 | | |
|  | 20 | (4, 1) | 1 | (4, 1) | 1 | | |
|  | 21 | (3, 1) | 1 | (3, 1) | 1 | | |
|  | 22 | (8, 1) | 1 | | | | |
|  | 23 | (7, 1) | 1 | | | | |
|  | 24 | (6, 1) | 1 | | | | |
|  | 25 | (2, 1) | 1 | | | | |
|  | 26 | (1, 1) | 1 | | | | |
|  | 27 | (0, 1) | 1 | | | | |

According to an example embodiment, the definition of REGs may be modified so that a REG may be defined over one RB in order to ensure that all REs are allocated to REGs. The definition of a REG over one RB may be expressed as principle (referred to herein as principle P"):

Ensure that the number of available REs after excluding overhead for RS or zero power REs is a multiple of 4.

Although the discussion focuses on specifying REGs over a single RB, the example embodiments presented herein may be operable with other numbers of RBs, for example, one, two, three, four, and the like. Therefore, the focus on one RB should not be construed as being limiting to either the scope or the spirit of the example embodiments.

Principle P" may impose a number of restrictions. For example, if the CSI-RS in a cell is defined for eight antenna ports, and muting is allowed, then the UE may assume that the number of muted CSI-RS ports is a multiple of two. The number of muted CSI-RS ports (as well as information regarding which ones are muted) may need to be signaled to the UE, over higher layer signaling, as an example.

In addition to the reserved RE(s) (e.g., already reserved in the technical or industrial standard), additional RE(s) available in the RB may be blocked from being used in REGs to ensure that the number requirement for REs is met to form a positive integer value of REGs in the RB. The blocked RE(s) are thus prohibited, along with the reserved RE(s) from being used in the REGs and, as such, they may be used as a reserved RE or for other purposes, e.g., transmitting data, reference signals, interference estimation, power boosting of signals in other REs, zero power transmitted to reduce interference to signals in the same position of other UEs/UEs of other cells and the like. Since blocked RE(s) may not be used to form a REG, blocked RE(s) may become additional reserved RE(s), and thereafter may be referred to as reserved RE's along with the RE's originally reserved or defined as reserved RE's under the applicable industrial or technical standard.

Figure 6A:
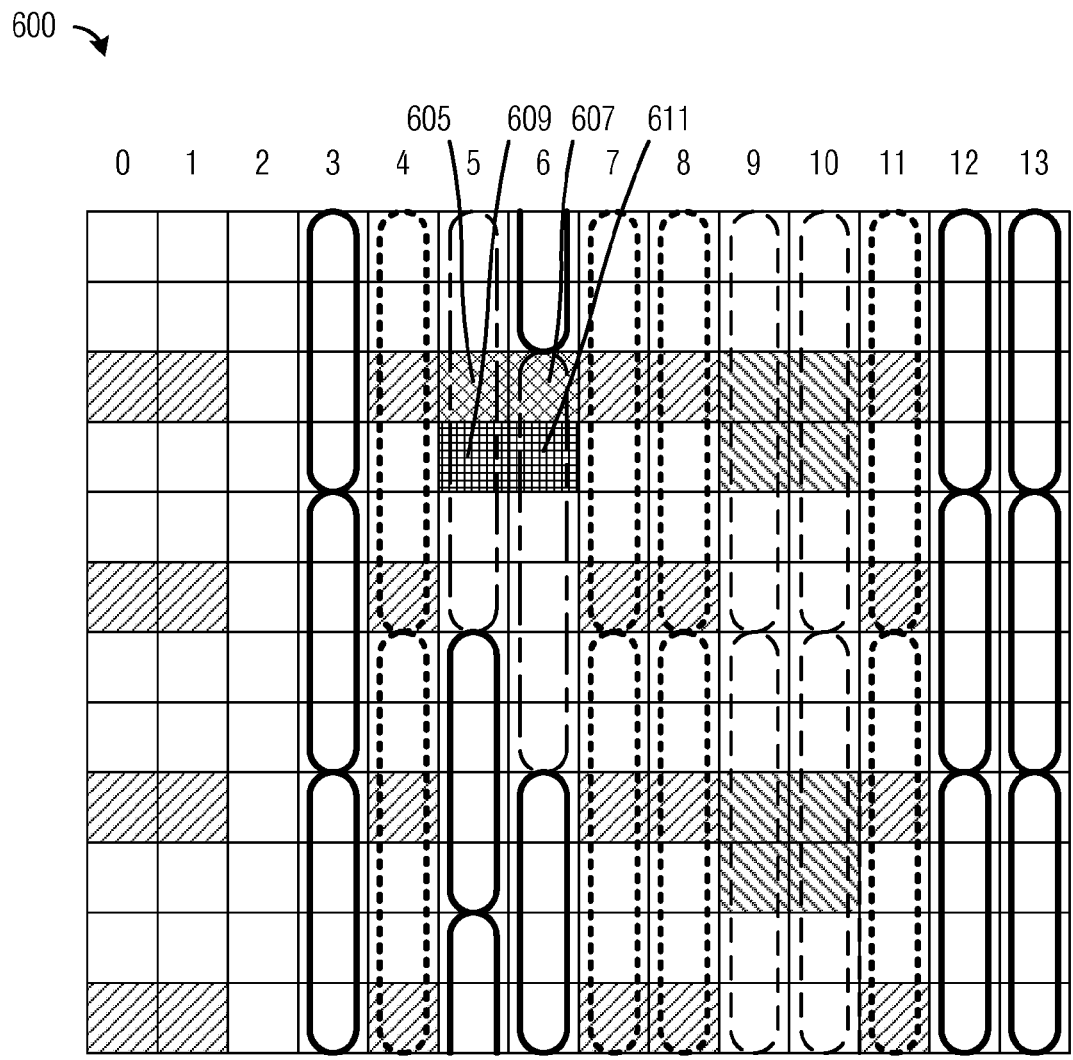
FIGS. 6a-6e illustrate example configurations for specifying REGs from REs over one RB according to example embodiments described herein.
Figure 6A:
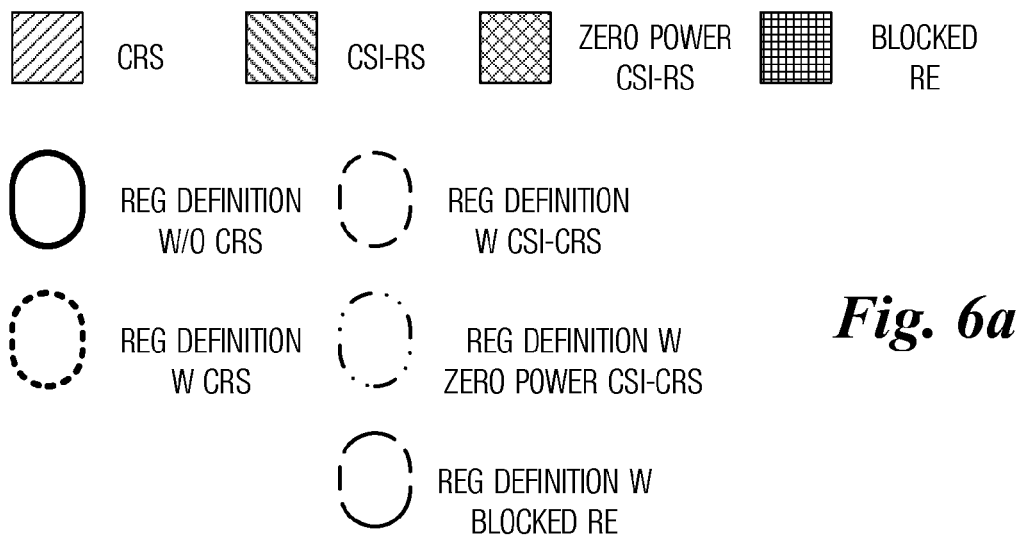

FIG. 6a illustrates a RB 600 with two CSI-RS ports and two reserved (blocked) REs. With two CSI-RS ports, RB 600 includes two REs that are used for the CSI-RS, RE 605 and RE 607. However, the use of RE 605 and RE 607 for the CSI-RS means that the number of REs that are available for REG definition is not a multiple of four, hence there may be a non-integer number of REGs or there may be some REs that are not allocated. Therefore, to ensure that the number of REs available for REG definition is a multiple of four, two REs in RB 600 may be reserved (blocked) (shown as RE 609 and RE 611). RE 609 and RE 611 may be referred to as reserved (blocked) REs and may be REs that ordinarily may be used to carry data (or R-PDCCHs as well as other control messages) but may be specifically prevented from being used to form REGs to ensure that the number of REs available for REG definition is a multiple of four.

With the two REs used for CSI-RS and two reserved (blocked) REs, the number of REs available for REG definition is a multiple of four, therefore, there is an integer number of REGs and there may be no wasted REs if the reserved (blocked) REs are used for some other purpose, such as transmitting data, reference signals, interference estimation, power boosting of signals in other REs, zero power transmitted to reduce interference to signals in the same position of other UEs/UEs of other cells and the like.

Figure 6B:
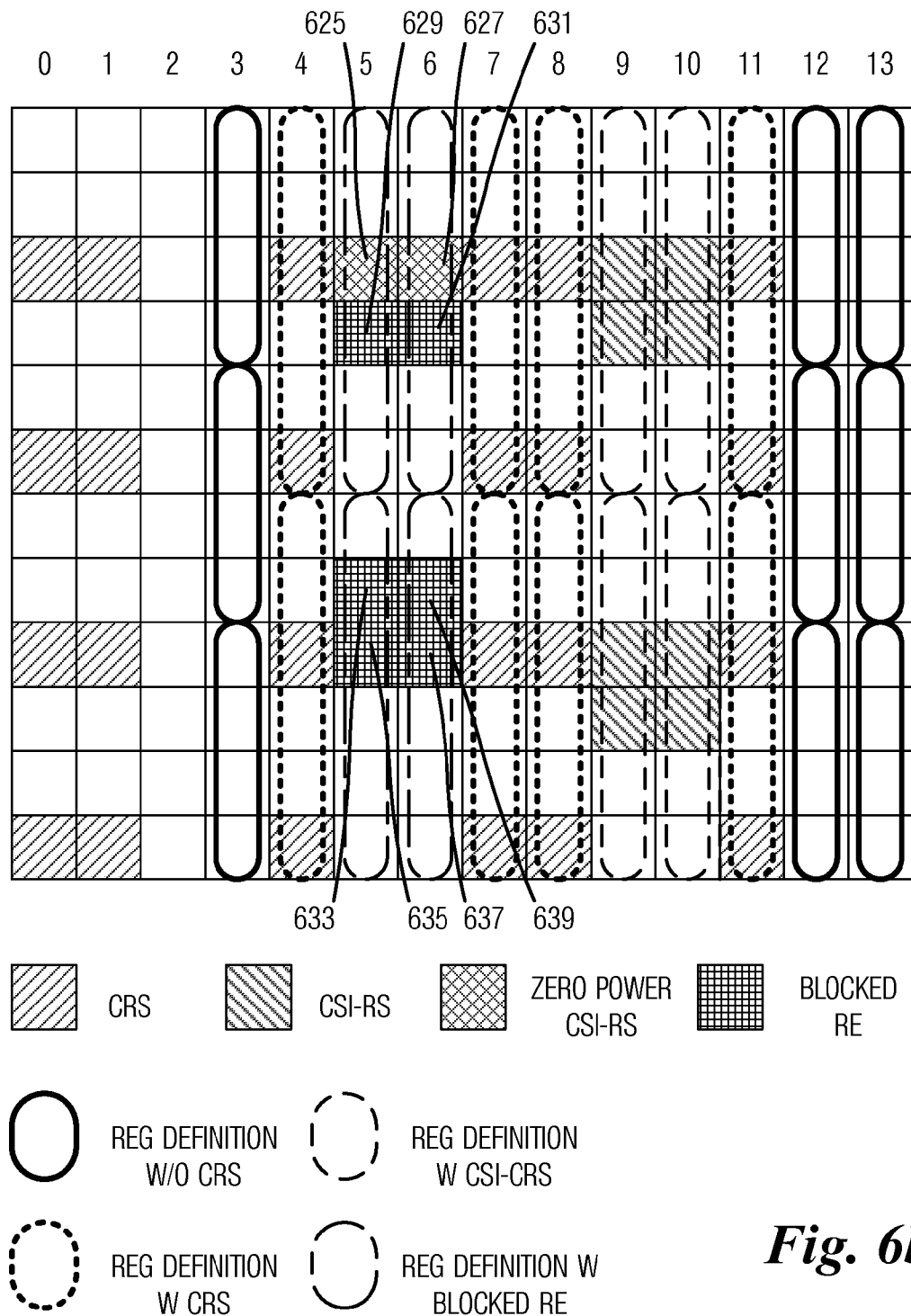

FIG. 6b illustrates a RB 620 with two CSI-RS ports and six reserved (blocked) REs. With two CSI-RS ports, RB 620 includes two REs that are used for the CSI-RS, RE 625 and RE 607. However, the use of RE 625 and RE 627 for the CSI-RS means that the number of REs that are available for REG allocation is not a multiple of four, hence there may be a non-integer number of REGs or there may be some REs that are not allocated. Therefore, to ensure that the number of REs available for REG allocation is a multiple of four, six REs in RB 620 may be reserved (blocked) (shown as RE 629, RE 631, RE 633, RE 635, RE 637, and RE 639).

With the two REs used for CSI-RS and six reserved (blocked) REs, RB 620 may have the appearance of having eight CSI-RS ports. The number of REs available for REG definition is a multiple of four, therefore, there is an integer number of REGs and there may be no wasted REs.

Figure 6C:
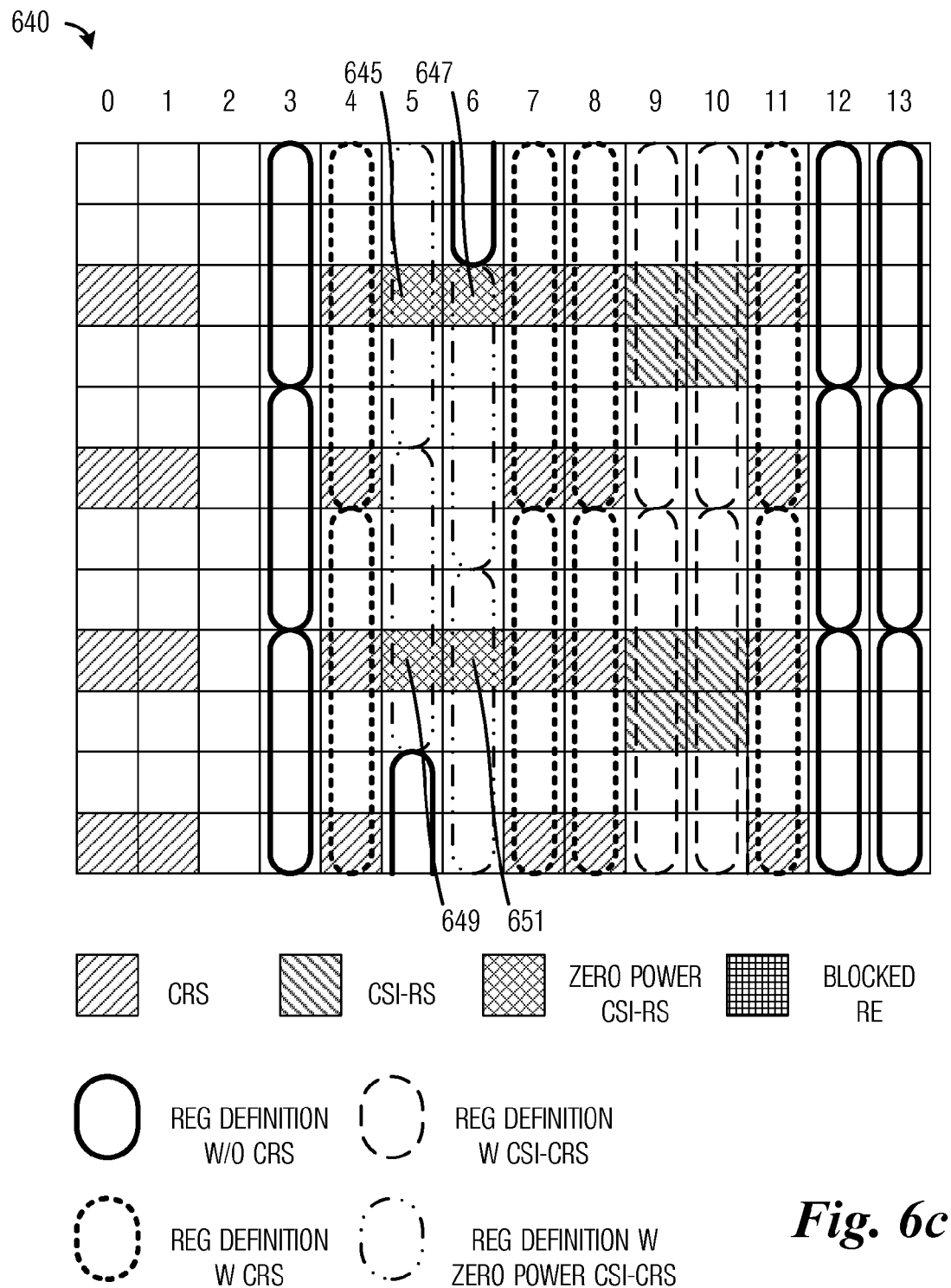

FIG. 6c illustrates a RB 640 with four CSI-RS ports and no reserved (blocked) REs. With four CSI-RS ports, RB 640 includes four REs that are used for the CSI-RS, RE 645, RE 647, RE 649, and RE 651. Since the number of REs that are available for REG definition is a multiple of four, there may be an integer number of REGs with no unallocated REs. Hence, no reserved REs may be needed.

Figure 6D:
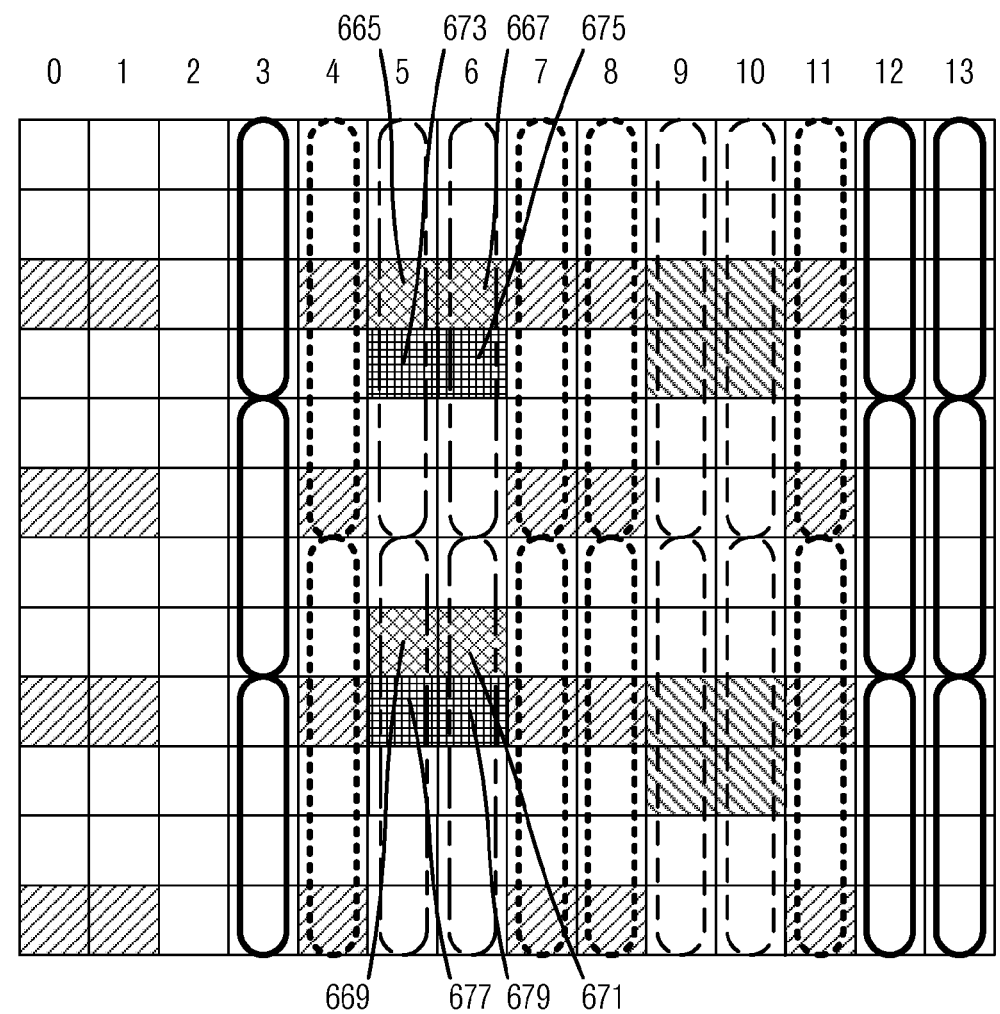

FIG. 6d illustrates a RB 660 with four CSI-RS ports and four reserved (blocked) REs. With four CSI-RS ports, RB 660 includes four REs that are used for the CSI-RS, RE 665, RE 667, RE 669, and RE 671. However, with the addition of four reserved (blocked) REs, RE 673, RE 675, RE 677, and RE 679, RB 660 may have the appearance of having eight CSI-RS ports. Since the number of REs available for REG definition is a multiple of four, there may be an integer number of REGs with no unallocated REs.

Figure 6E:
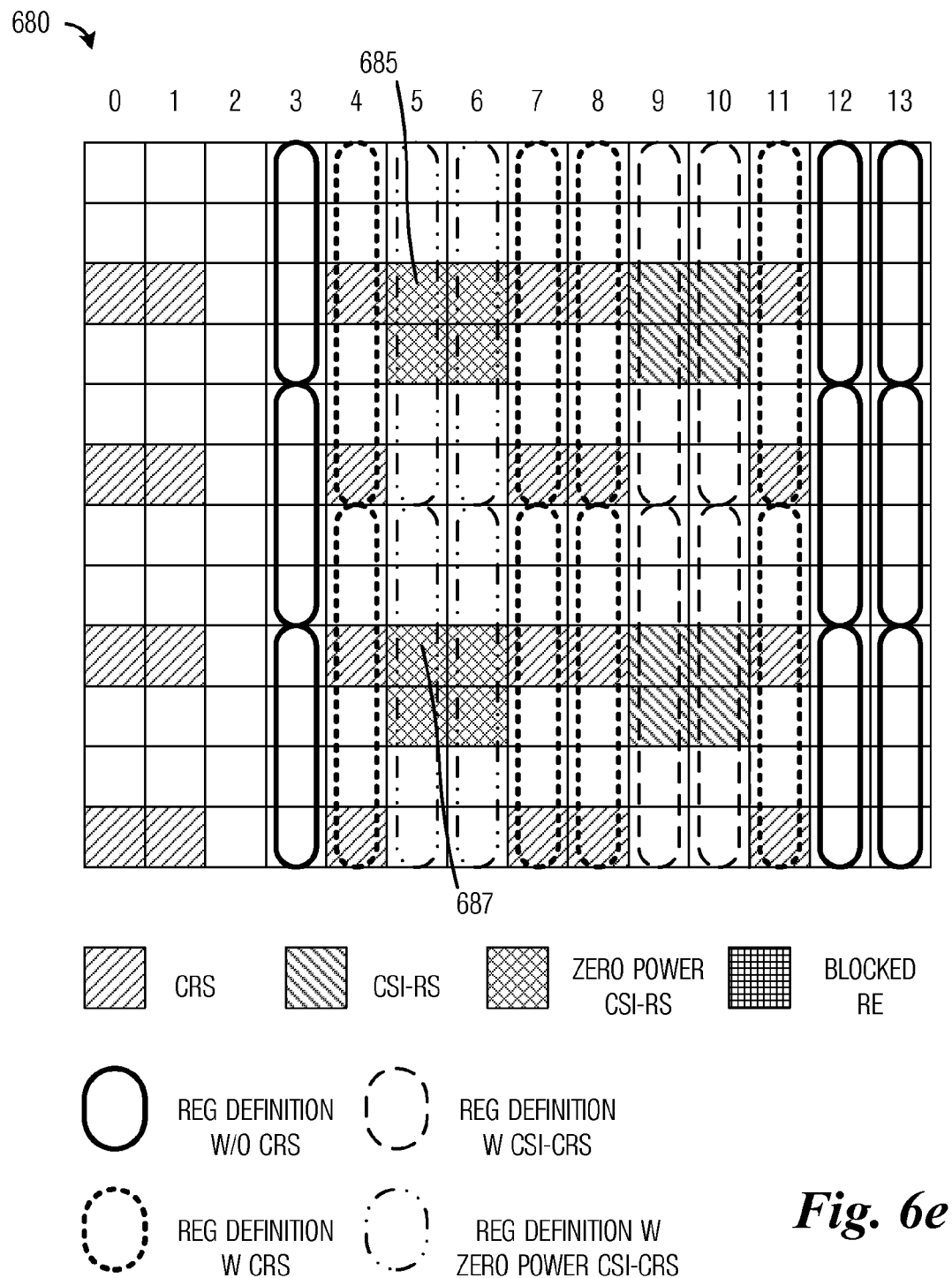

FIG. 6e illustrates a RB 680 with eight CSI-RS ports and no reserved (blocked) REs. With eight CSI-RS ports, RB 680 includes eight REs that are used for CSI-RS, such as RE 685 and RE 687. Therefore, the number of REs available for REG definition is a multiple of four, and there may be an integer number of REGs with no unallocated REs.

In general, a REG is represented by the index pair (k,l) of the RE with the lowest index k in the group with all REs in the REG having the same value of l. The number of REs (k,l) in a REG for mapping of R-PDCCH is always 4 after discounting the REs configured for CSI-RS transmission and/or configured for RE muting, and/or the CRS. When CSI-RS are configured, 4 or 8 CSI-RS are assumed for discounting the REs for mapping of control channels to REs; when muting REs are configured, multiple of 2 4-port CSI-RS should be configured.

The set of REs (k,l) in a REG depends on the number of CRS, CSI-RS and muted REs configured as described below with $k_0 = n_{PRB} \cdot N_{sc}^{RB}$, $0 \leq n_{PRB} < N_{RB}^{DL}$.

In the case CRS are configured, in the first or fifth OFDM symbol of the first or second slot in a subframe the two REGs in physical resource block $n_{PRB}$ consist of REs (k,l=0) or (k,l=4) or (k,l=7) or (k,l=11) with $k=k_0+0, k_0+1, \ldots, k_0+5$ and $k=k_0+6, k_0+7, \ldots, k_0+11$, respectively.

In the second OFDM symbol of the first or second slot in a subframe in case of one or two CRS configured, the three REGs in physical resource block $n_{PRB}$ consist of REs (k,l=1) or (k,l=8) with $k=k_0+0, k_0+1, \ldots, k_0+3, k=k_0+4, k_0+5, \ldots, k_0+7$ and $k=k_0+8, k_0+9, \ldots, k_0+11$, respectively.

In the second OFDM symbol of the first or second slot in a subframe in case of four CRS configured, the two REGs in physical resource block $n_{PRB}$ consist of REs (k,l=1) or (k,l=8) with $k=k_0+0, k_0+1, \ldots, k_0+5$ and $k=k_0+6, k_0+7, \ldots, k_0+11$, respectively.

In the third OFDM symbol of the first slot in a subframe, the three REGs in physical resource block $n_{PRB}$ consist of REs (k,l=2) with $k=k_0+0, k_0+1, \ldots, k_0+3, k=k_0+4, k_0+5, \ldots, k_0+7$ and $k=k_0+8, k_0+9, \ldots, k_0+11$, respectively.

In the fourth OFDM symbol of the first slot in a subframe in case of normal cyclic prefix, the three REGs in physical resource block $n_{PRB}$ consist of REs (k,l=3) with $k=k_0+0,$ $k_0+1, \ldots, k_0+3$, $k=k_0+4$, $k_0+5, \ldots, k_0+7$ and $k=k_0+8$, $k_0+9, \ldots, k_0+11$, respectively.

In the fourth OFDM symbol of the first slot in a subframe in case of extended cyclic prefix, the two REGs in physical resource block $n_{PRB}$ consist of REs (k,l=3) with $k=k_0+0$, $k_0+1, \ldots, k_0+5$ and $k=k_0+6, k_0+7, \ldots, k_0+11$, respectively.

In the OFDM symbol when CSI-RS are transmitted, and/or REs are muted. For muting, there are the following agreements in the RAN1#62bis meeting.

Muting configuration is cell-specific and signaled via higher-layer signaling. PDSCH muting is performed over a bandwidth that follows the same rule as the CSI-RS.

A UE may assume downlink CSI-RS Energy Per RE (EPRE) is constant across the downlink system bandwidth and constant across all subframes until different CSI-RS information is received.

The intra-subframe location of muted REs is indicated by a 16-bit bitmap. Each bit corresponds to a 4-port CSI-RS configuration. All REs used in a 4-port CSI-RS configuration set to 1 are muted (zero power assumed at UE), except for the CSI-RS REs if they belong to this CSI-RS configuration. This signaling is common for FDD and TDD CSI-RS configurations.

Thus muting can be set by 4-port CSI-RS configuration. Then the set of REs (k,l) in a REG is as described herein.

Figure 7A:
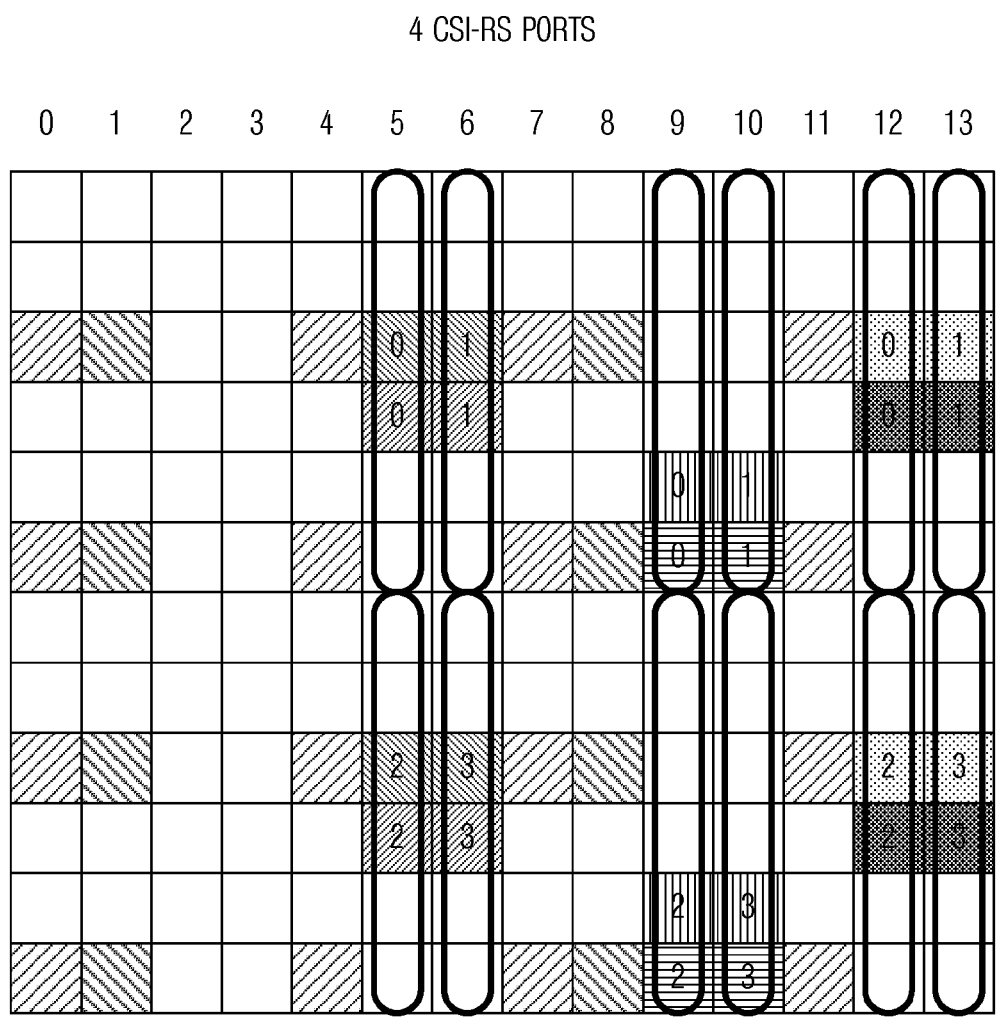
FIGS. 7a and 7b illustrate example first configurations for specifying REGs from REs with four and eight CSI-RS ports according to example embodiments described herein.
Figure 7B:
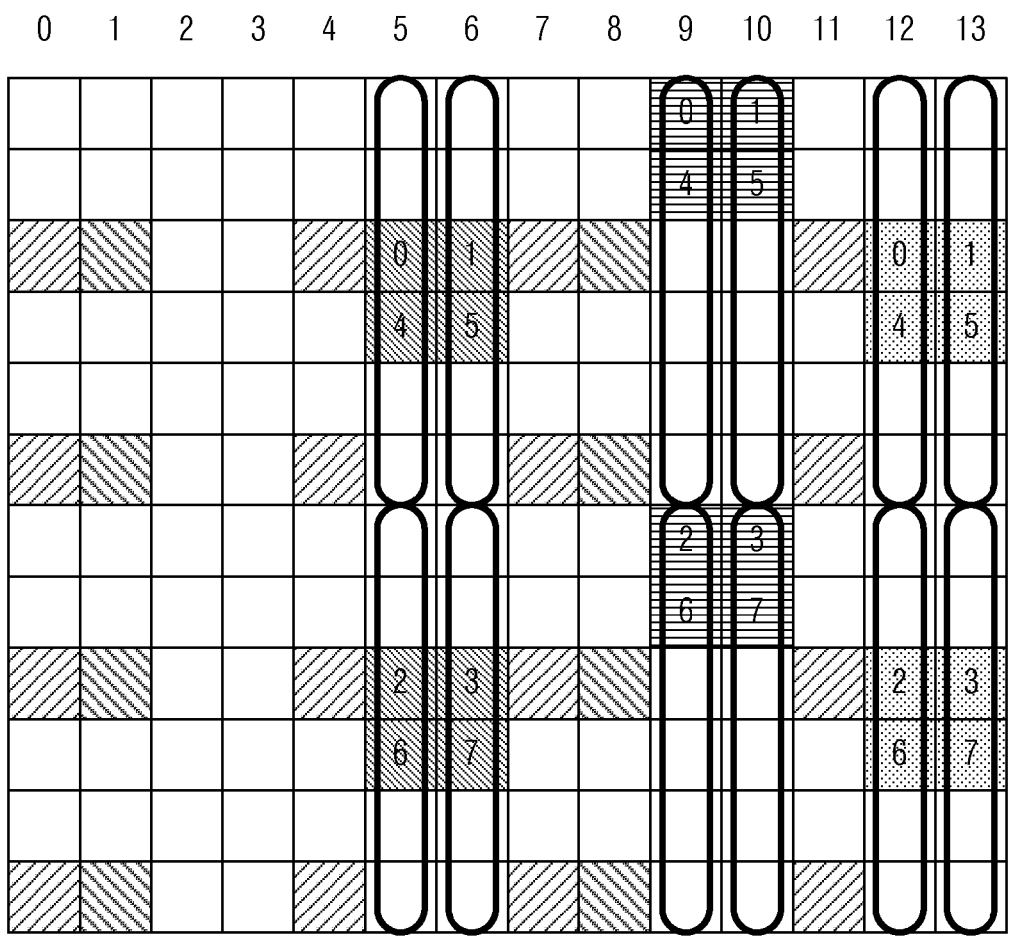

In the sixth or seventh OFDM symbol of the first slot or second slot in a subframe, or third or fourth OFDM symbol of the second slot in a subframe in case of 1, 2, 4, or 8 CSI-RS configured or 2 4-port CSI-RS muting configured, the two REGs in physical resource block $n_{PRB}$ consist of REs (k,l=5) or (k,l=6) or (k,l=12) or (k,l=13) or (k,l=9) or (k,l=10) with $k=k_0+0, k_0+1, \ldots, k_0+5$ and $k=k_0+6, k_0+7, \ldots, k_0+11$, respectively. An illustration is shown in FIGS. 7a and 7b.

Figure 8A:
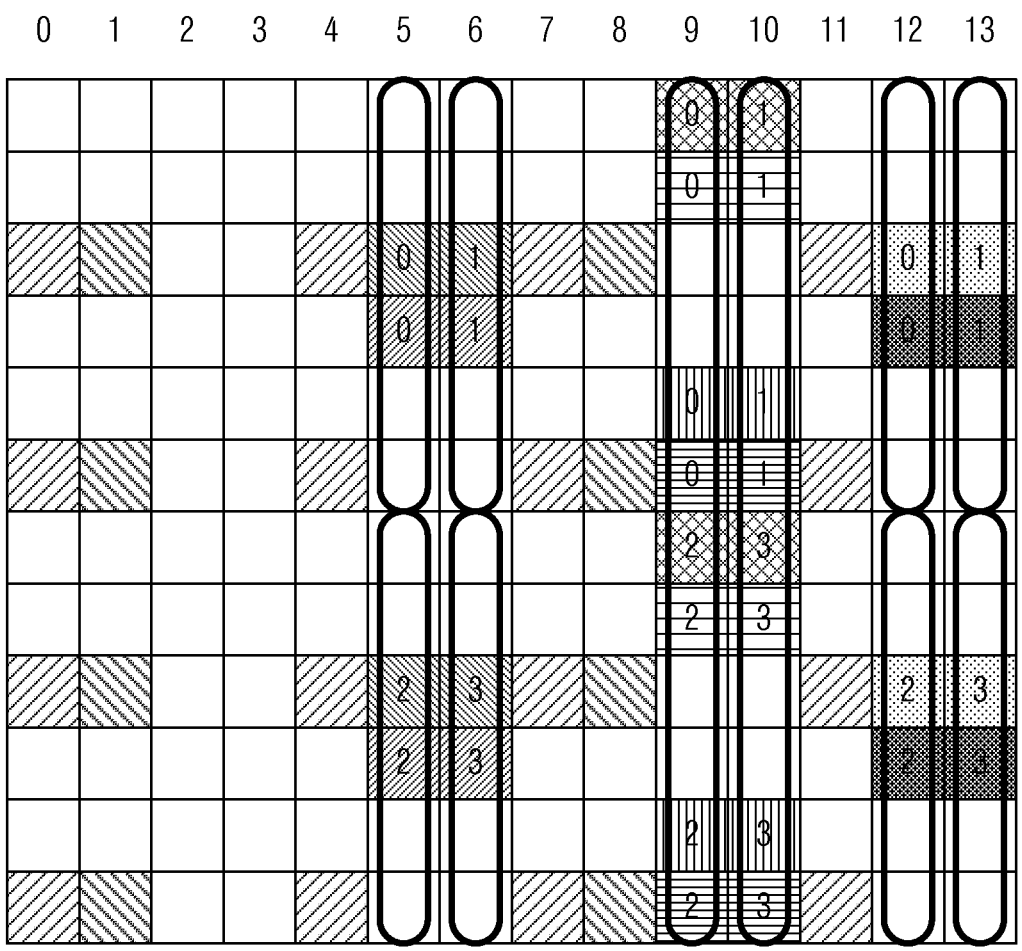
FIGS. 8a and 8b illustrate example second configurations for specifying REGs from REs with four and eight CSI-RS ports according to example embodiments described herein.
Figure 8B:
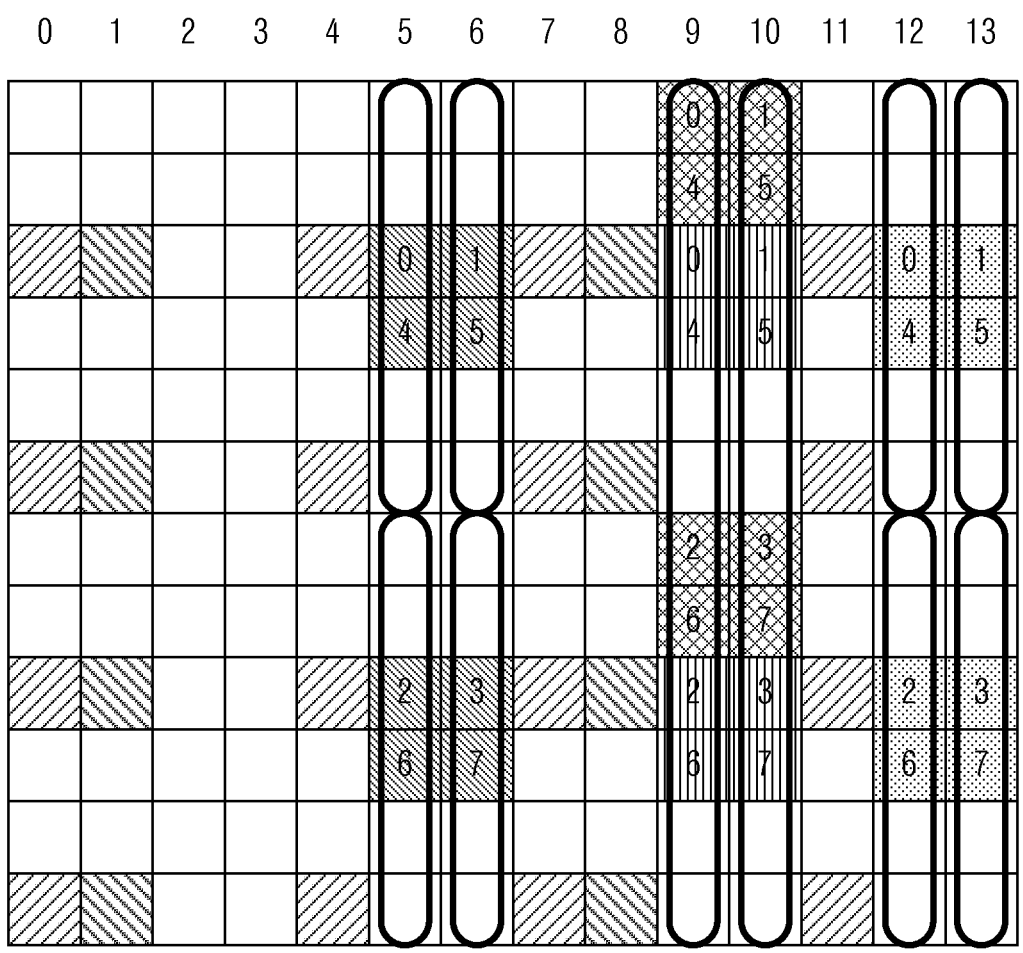

In the third or fourth OFDM symbol of the second slot in a subframe in case of 1, 2, 4, 8 CSI-RS and 2 4-port CSI-RS configured or 4 4-port CSI-RS configured, the one REG in physical resource block $n_{PRB}$ consist of REs (k,l=9) or (k,l=10) with $k=k_0+0, k_0+1, \ldots, k_0+11$. An illustration is shown in FIGS. 8a and 8b, illustrating a situation when CSI-RS are not transmitted, and REs are not muted.

Figure 9:
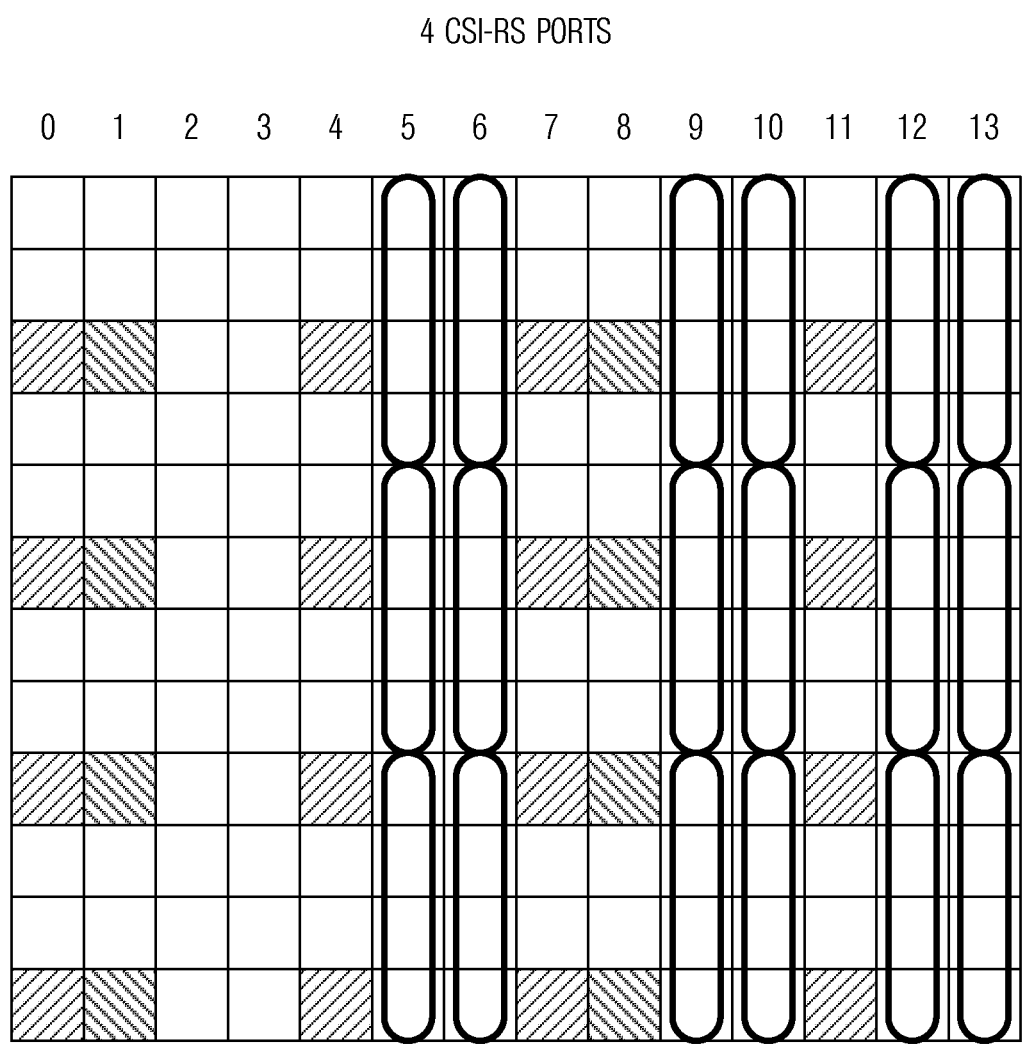
FIG. 9 illustrates an example third configuration for specifying REGs from REs with eight CSI-RS ports according to example embodiments described herein.

In the sixth or seventh OFDM symbol of the first or $2^{nd}$ slot, or in the third or fourth OFDM symbol of the second slot in a subframe in case of no CSI-RS configured or no muting REs configured, the three REGs in physical resource block $n_{PRB}$ consist of REs (k,l=5) or (k,l=6) or (k,l=9) or (k,l=10) or (k,l=12) or (k,l=13) with $k=k_0+0, k_0+1, \ldots, k_0+3$, $k=k_0+4$, $k_0+5, \ldots, k_0+7$ and $k=k_0+8, k_0+9, \ldots, k_0+11$, respectively. An illustration is shown in FIG. 9.

Mapping of a symbol-quadruplet $\langle z(i), z(i+1), z(i+2), z(i+3) \rangle$ onto a REG represented by RE (k',l') is defined such that elements z(i) are mapped to RE (k,l) of the REG not used for CRS in increasing order of i and k. In case a single CRS is configured, CRS may be assumed to be present on antenna ports 0 and 1 for the purpose of mapping a symbol-quadruplet to a REG, otherwise the number of CRS may be assumed equal to the actual number of antenna ports used for CRS. The UE does not make any assumptions about REs assumed to be reserved for RS but not used for transmission of a RS.

According to an example embodiment, in situations wherein two RBs or multiples of two RBs may be available for use in transmitting the multiple R-PDCCHs, principle P' may be used to specify the REGs that are available for assignment in transmitting the R-PDCCHs.

According to an example embodiment, in situations wherein one or more RBs are available for use in transmitting the multiple R-PDCCHs, principle P''' may be used to specify the REGs that are available for assignment in transmitting the R-PDCCHs.

Figure 10:
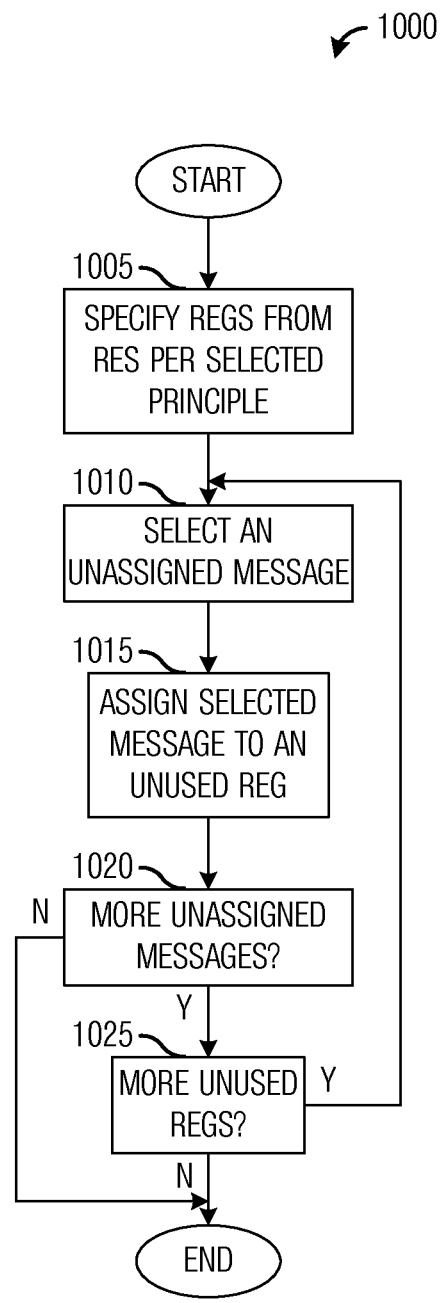
FIG. 10 illustrates an example flow diagram of communications controller operations in interleaving multiple control messages, such as R-PDCCHs, to REGs of one or more RBs according to example embodiments described herein.

FIG. 10 illustrates a flow diagram of communications controller operations 1000 in interleaving multiple control messages, such as R-PDCCHs, to REGs of one or more RBs. Communications controller operations 1000 may be indicative of operations occurring in a communications controller, such as an eNB, a low power cell, and the like, as the communications controller interleaves multiple control messages onto one or more RBs.

Communications controller operations 1000 may begin with the communications controller specifying (or defining) REGs from REs of RB(s) per selected principle to form a pool of unused REGs (block 1005). Depending on communications system configuration, such as a number of CSI-RS ports used per RB, a number of RBs available, and the like, the communications controller may select either principle P' or principle P''' to specify REGs from REs. As an example, if only one RB is available to transmit the multiple control messages, then the communications controller may select principle P''' to specify REG from REs. While, if two RBs are available to transmit the multiple control messages, then the communications controller may select either principle P' or principle P''' to specify REGs from REs. Furthermore, if principle P' is selected to specify the REGs from REs, the communications controller may need to decide how to logically combine (if at all) the two RBs, e.g., horizontally placing or vertically stacking, as well as how to allocate the REs across OFDM symbols.

Alternatively, the principle (either principle P' or principle P''') may be selected a priori by an operator of the communications system, a technical standards definition, and the like. Which ever principle is selected or specified may then be used by the communications controller. Therefore, the communications controller may have no part in selecting the way in which the REs are allocated to REGs.

The communications controller may select an unassigned control message (or a portion of an unassigned message if the unassigned message is larger than a single REG) to assign to an unused REG from the pool of unused REGs (block 1010). According to an example embodiment, the communications controller may select the unassigned control message from a pool of unassigned control messages. The selection of the unassigned control message may be random, or it may be based on a selection criteria. Examples of selection criteria may include age of the control message, priority of the control message, service history of a recipient of the control message, priority of the recipient of the control message, size of the control message, available number of unused REGs in the pool of unused REGs, and the like. If the unassigned control messages are larger than a REG, then additional selection criteria may include if a portion of the unassigned control message already been assigned.

According to an example embodiment, if the selected unassigned control message is larger than a single REG, then the communications controller may assign the parts of the selected unassigned control message to multiple REGs from the pool of unused REGs until the entirety of the selected unassigned control message is assigned.

The selected unassigned control message (or the selected portion of an unassigned control message) may be assigned to an unused REG from the pool of unused REGs (block 1015). The unused REG may be selected from the pool of unused REGs based on an interleaving rule or function. The interleaving rule may be defined to help improve tolerance to errors, improve frequency diversity, and the like.

According to an example embodiment, the selected unassigned control message may be assigned to REGs distributed throughout the RB(s). For example, if the selected unassigned control message is larger than a single REG, then the different parts of the selected unassigned control message may be assigned to unused REGs that are located at different parts of the RB to help increase frequency diversity.

The communications controller may perform a check to determine if there are more unassigned control messages (block 1020). If there are no more unassigned control messages, then communications controller operations 1000 may terminate.

If there are more unassigned control messages, the communications controller may perform a check to determine if there are more unused REGs in the pool of unused REGs (block 1025). If there are no more unused REGs, then communications controller operations 1000 may terminate to begin again when additional unused REGs become available.

If there are more unused REGs, the communications controller may return to block 1010 to select another unassigned control message (or a portion of an unassigned control message) to assign to an unused REG.

Figure 11:
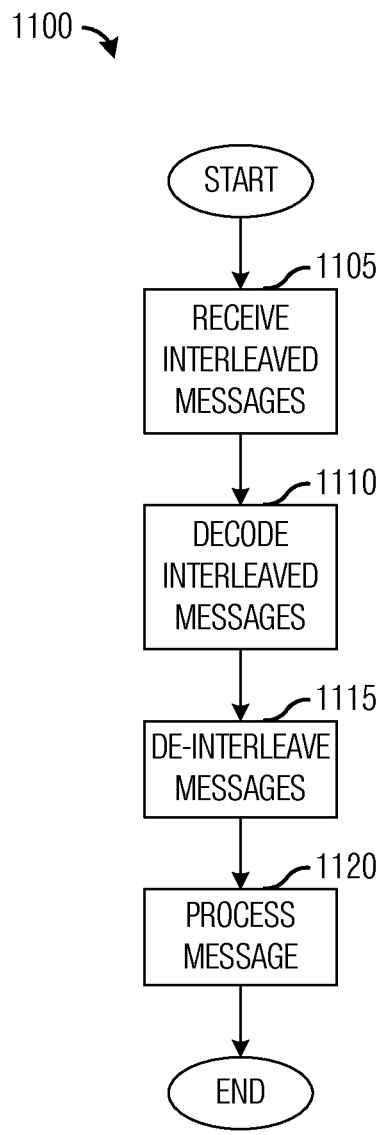
FIG. 11 illustrates an example flow diagram of operations at a device as the device receives and processes interleaved control messages according to example embodiments described herein.

FIG. 11 illustrates a flow diagram of operations 1100 at a device as the device receives and processes interleaved control messages. Operations 1100 may be indicative of operations occurring at a device, such as a RN or a UE, as the device receives interleaved control messages and processes the interleaved control messages to find a control message intended for the device.

Although the discussion of FIG. 11 focuses on interleaved R-PDCCHs, the example embodiments discussed herein may be applicable to other forms of control messages, such as U-PHICHs, U-PDCCHs, E-PDCCH, ePDCCH, frequency domain extensions of PDCCHs, and the like. Therefore, the discussion of R-PDCCHs should not be construed as being limiting to either the scope or the spirit of the example embodiments.

Operations 1100 may begin with the device receiving the interleaved control messages transmitted by a communications controller, i.e., one or more RBs (block 1105). The interleaved control messages may include control messages intended for a number of devices, not just the device receiving the interleaved control messages. The device may decode the interleaved control messages to produce decoded but still interleaved control messages (block 1110).

The device may then make use of a known definition of REs of RB(s) into REGs to determine the REGs used to transmit the control messages, as well as a known interleaving rule or function (or corresponding de-interleaving rule or function) to de-interleave the decoded but still interleaved control messages (block 1115). The decoded but still interleaved control messages comprise a plurality of REGs, with each REG containing at least a portion of a control message. According to an example embodiment, the communications controller may make use of either principle P' if two RBs (or multiples of two RBs) are used to transmit the control messages or principle P''' if one or more RBs are used to transmit the control messages to determine the specification of REs of RB(s) into REGs. The use of either principle P' or principle P''' may be predetermined by an operator of a communications system or by a technical standard specification. Hence, the device may be able to readily determine which principle was used to assign REs of RB(s) to REGs.

According to an example embodiment, the device may use either principle P' or principle P''' to identify REGs in the decoded but still interleaved control messages. The device may make use of the interleaving rule or function (or the corresponding de-interleaving rule or function) to select REG(s) of a single control message to reconstruct the control messages present in the decoded but still interleaved control message, thereby producing a plurality of de-interleaved control messages.

The device may process the plurality of de-interleaved control messages to find a control message intended for it (block 1120).

Figure 12:
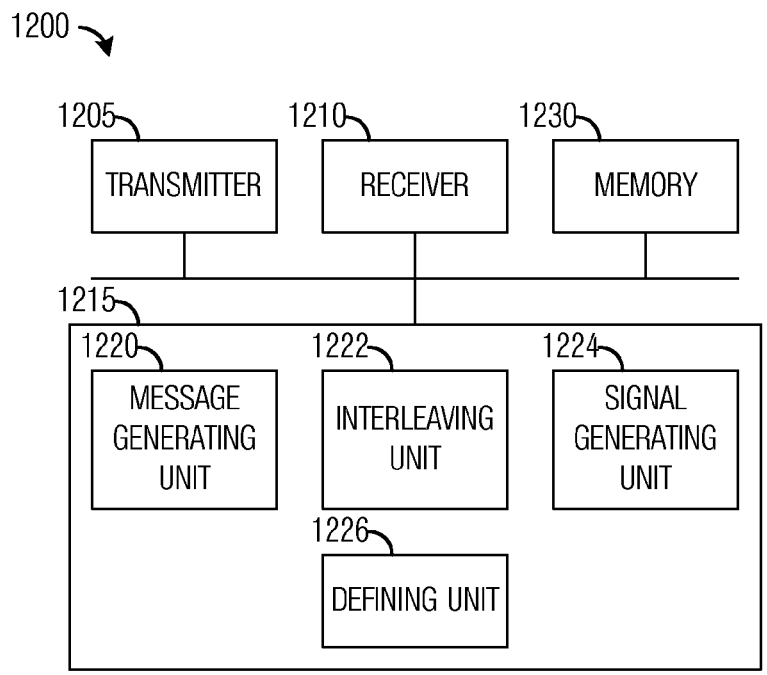
FIG. 12 illustrates an example communications controller according to example embodiments described herein.

FIG. 12 illustrates a diagram of a communications controller 1200. Communications controller 1200 may be an implementation of an eNB, a low power node, and the like, of a communications system. Communications controller 1200 may be used to implement various ones of the embodiments discussed herein. As shown in FIG. 12, a transmitter 1205 is configured to send control channels, messages, information, and the like, and a receiver 1210 is configured to receive messages, information, and the like. Transmitter 1205 and receiver 1210 may have a wireless interface, a wireline interface, or a combination thereof.

A message generating unit 1220 is configured to generate control messages. Message generating unit 1220 may generate control messages by generating control data, selection of a modulation and coding scheme (MCS) (as well as an aggregation level if needed), and encoding. An interleaving unit 1222 is configured to interleave (e.g., assign and place) the control messages using a REG as a basic interleaving unit. The REGs may be specified from REs of RB(s) using principle P' or principle P''', which may be predetermined for the communications controller 1200. Interleaving unit 1222 may interleave the control messages using an interleaving function, which may also be predetermined for the communications device 1200.

A signal generating unit 1224 is configured to generate signals for transmitting the interleaved control messages. Transmitter 1205 may be used to transmit the signals generated by signal generating unit 1224. A defining unit 1226 is configured to define the REGs from REs using principle P' or principle P'''. Defining unit 1226 is also configured to assign resource elements to fill the REGs, and block unassigned resource elements. A memory 1230 is configured to store RE to REG assignment information (e.g., principle P' or principle P'''), interleaving function(s), control data for the control messages, and the like.

The elements of communications controller 1200 may be implemented as specific hardware logic blocks. In an alternative, the elements of communications controller 1200 may be implemented as software executing in a processor, controller, application specific integrated circuit, and the like. In yet another alternative, the elements of communications controller 1200 may be implemented as a combination of software and/or hardware.

As an example, transmitter 1205 and receiver 1210 may be implemented as a specific hardware block, while message generating unit 1220, interleaving unit 1222, signal generating unit 1224, and defining unit 1226 may be software modules executing in a processor 1215, a microprocessor, a digital signal processor, a custom circuit, or a custom compiled logic array of a field programmable logic array.

Figure 13:
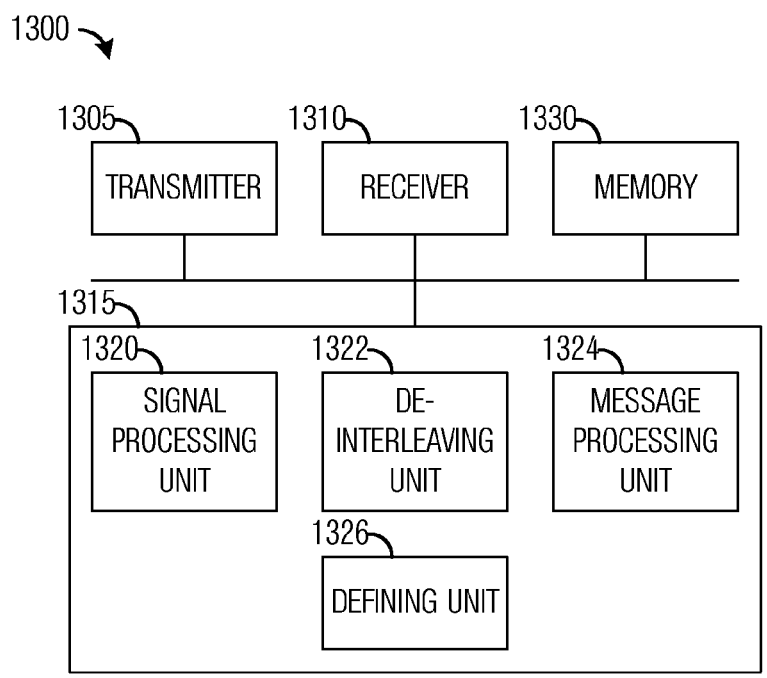
FIG. 13 illustrates an example communications device according to example embodiments described herein.

FIG. 13 illustrates a diagram of a communications device 1300. Communications device 1300 may be an implementation of an RN, a UE, and the like, of a communications system. Communications device 1300 may be used to implement various ones of the embodiments discussed herein. As shown in FIG. 13, a transmitter 1305 is configured to send control channels, messages, information, and the like, and a receiver 1310 is configured to receive messages, information, and the like. Transmitter 1305 and receiver 1310 may have a wireless interface, a wireline interface, or a combination thereof.

A signal processing unit 1320 is configured to provide processing, such as decoding, to interleaved control signals received by communications device 1300. A de-interleaving unit 1322 is configured to de-interleave the decoded but still interleaved control messages provided by signal processing unit 1320. De-interleaving unit 1322 may make use of a REG as a basic interleaving unit. The REGs may be specified from REs of RB(s) using principle P' or principle P''', which may be predetermined for the communications device 1300. De-interleaving unit 1322 may also make use of an interleaving function (or a corresponding de-interleaving function) to de-interleave the decoded but still interleaved control messages.

A message processing unit 1324 is configured to process a control message intended for communications device 1300. A defining unit 1326 is configured to define the REGs from REs using principle P' or principle P'''. A memory 1330 is configured to store RE to REG assignment information (e.g., principle P' or principle P'''), de-interleaving function(s), control data for the control messages, and the like.

The elements of communications device 1300 may be implemented as specific hardware logic blocks. In an alternative, the elements of communications device 1300 may be implemented as software executing in a processor, controller, application specific integrated circuit, and the like. In yet another alternative, the elements of communications device 1300 may be implemented as a combination of software and/or hardware.

As an example, transmitter 1305 and receiver 1310 may be implemented as a specific hardware block, while signal processing unit 1320, de-interleaving unit 1322, message processing unit 1324, and defining unit 1326 may be software modules executing in a processor 1315, a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for operating a communications controller, the method comprising:
   defining a positive integer quantity of control channel resource element groups in a data region of a resource block, the resource block having a total number of resource elements, the total number of resource elements consisting of available resource elements and reserved resource elements, wherein some of the reserved resource elements are muted, and wherein the positive integer quantity of control channel resource element groups exclude any resource elements mapped to reference signals;
   assigning a plurality of available resource elements to fill in each of the positive integer quantity of control channel resource element groups with a same number N available resource elements in each resource element group;
   blocking unassigned available resource elements from being used as assigned available resource elements in the positive integer quantity of control channel resource element groups, wherein every resource element in the data region of the resource block is either blocked, reserved or assigned;
   interleaving a plurality of control messages onto the positive integer quantity of control channel resource element groups; and
   transmitting the positive integer quantity of control channel resource element groups.

2. The method of claim 1, wherein N is equal to 4.

3. The method of claim 1, wherein interleaving the plurality of control messages comprises mapping each control message in the plurality of control messages to at least one respective resource element group in the positive integer quantity of control channel resource element groups.

4. The method of claim 3, wherein a first control message is larger than a single resource element group, and wherein the mapping comprises:
   partitioning the first control message into a plurality of control message units, each equal to or less than a resource block group in information capacity; and
   mapping the plurality of control message units to the positive integer quantity of control channel resource element groups.

5. The method of claim 1, wherein the reserved resource elements are reserved for transmitting a common reference signal, a channel state information reference signal, a zero power channel state information reference signal, or a combination thereof.

6. The method of claim 1, wherein there are M reserved resource elements, where M is a positive integer value, wherein there are L unassigned available resource elements, where L is a positive integer value, and wherein M plus L is a multiple of 2.

7. The method of claim 6, wherein M plus L is equal to 8.

8. The method of claim 1, wherein the resource block comprises a resource block pair, two half resource blocks, or a two half resource block pair.

9. The method of claim 1, wherein the positive integer quantity of control channel resource element groups are transmitted in a Third Generation Partnership Project Long Term Evolution compliant communications system.

10. The method of claim 1, wherein the positive integer quantity of control channel resource element groups are transmitted over a relay physical downlink control channel or an extended physical downlink control channel.

11. A method for operating a communications controller, the method comprising:
   defining a positive integer quantity of control channel resource element groups with a positive integer number N resource elements in each resource element group;
   determining a positive integer quantity of resource blocks necessary for providing sufficient available data region resource elements to fill each resource element group with a same positive integer number N available resource elements, a total number of resource elements across data regions of the positive integer quantity of resource blocks consisting of available resource elements and reserved resource elements prohibited from being assigned to a resource element group, wherein some of the reserved resource elements are muted, wherein the positive integer quantity of control channel resource element groups exclude any resource elements mapped to reference signals, and wherein at least one of the positive integer quantity of control channel resource element groups spans across two of the resource blocks;
   assigning all available resource elements to the positive integer quantity of control channel resource element groups;

interleaving a plurality of control messages onto the positive integer quantity of control channel resource element groups; and transmitting the positive integer quantity of control channel resource element groups.

12. The method of claim 11, wherein the positive integer quantity of resource blocks is two resource blocks, wherein the two resource blocks are aligned horizontally, and wherein assigning all available resource elements comprises assigning the available resource elements in a column order within each of the two resource blocks.

13. The method of claim 11, wherein the positive integer quantity of resource blocks is two resource blocks, wherein the two resource blocks are aligned vertically, and wherein assigning all available resource elements comprises assigning the available resource elements in a column order within each of the two resource blocks.

14. The method of claim 11, wherein the positive integer quantity of resource blocks is two resource blocks, wherein the two resource blocks are aligned vertically, and wherein assigning all available resource elements comprises assigning the available resource elements in a column order spanning the two resource blocks.

15. The method of claim 11, wherein the positive integer quantity of resource blocks is two resource blocks, and wherein assigning all available resource elements comprises:

assigning the available resource elements in a first resource block in a column order to a first portion of the positive integer quantity of control channel resource element groups;

assigning the available resource elements in a second resource block in a column order to a second portion of the positive integer quantity of control channel resource element groups; and assigning previously unassigned available resource elements of the two resource blocks to an additional resource element group in the positive integer quantity of control channel resource element groups.

16. A method for operating a communications device, the method comprising:

receiving a resource block including a plurality of control messages interleaved within a positive integer quantity of control channel resource element groups defined in a data region of the resource block, the resource block having a total number of resource elements, the total number of resource elements consisting of available resource elements, reserved resource elements, and blocked available resource elements remaining after a plurality of potentially-available resource elements have been assigned to fill in each of the positive integer quantity of control channel resource element groups with a same number N available resource elements in each resource element group, wherein some of the reserved resource elements are muted, and wherein the positive integer quantity of control channel resource element groups exclude any resource elements mapped to reference signals;

de-interleaving the plurality of control messages from the received resource block; and selecting a control message for the communications device from the plurality of control messages.

17. The method of claim 16, wherein N is equal to 4.

18. The method of claim 16, wherein de-interleaving the plurality of control messages is in accordance with a de-interleaving rule.

19. The method of claim 16, wherein there are M reserved resource elements, where M is a positive integer value, wherein there are L blocked available resource elements, where L is a positive integer value, and wherein M plus L is a multiple of 2.

20. The method of claim 19, wherein M plus L is equal to 8.

21. A method for operating a communications device, the method comprising:

receiving a positive integer quantity of resource blocks including a plurality of control messages interleaved within a positive integer quantity of control channel resource element groups with a positive integer N resource elements in each resource element group, the positive integer quantity of resource blocks providing sufficient available data region resource elements to fill each resource element group with a same positive integer number N available resource elements, a total number of resource elements across data regions of the positive integer quantity of resource blocks consisting of available resource elements and reserved resource elements prohibited from being assigned to a resource element group, wherein some of the reserved resource elements are muted, wherein the positive integer quantity of control channel resource element groups exclude any resource elements mapped to reference signals, and wherein at least one of the positive integer quantity of control channel resource element groups spans across two of the resource blocks;

de-interleaving the plurality of control messages from the received positive integer quantity of resource blocks; and selecting a control message for the communications device from the plurality of control messages.

22. The method of claim 21, wherein de-interleaving the plurality of control messages is in accordance with a de-interleaving rule.

23. The method of claim 21, wherein the positive integer quantity of resource blocks is two resource blocks, and wherein at least one resource element group in the positive integer quantity of control channel resource element groups spans the two resource blocks.

24. A communications controller comprising:

a processor configured to define a positive integer quantity of control channel resource element groups with a positive integer number N resource elements in each resource element group, to determine a positive integer quantity of resource blocks necessary for providing sufficient available data region resource elements to fill each resource element group with a same positive number N available resource elements, a total number of resource elements across data regions of the positive integer quantity of resource blocks consisting of available resource elements and reserved resource elements prohibited from being assigned to a resource element group, wherein some of the reserved resource elements are muted, wherein the positive integer quantity of control channel resource element groups exclude any resource elements mapped to reference signals, and wherein at least one of the positive integer quantity of control channel resource element groups spans across two of the resource blocks, to assign all available resource elements to the positive integer quantity of control channel resource element groups, and to interleave a plurality of control messages onto the positive integer quantity of control channel resource element groups; and a transmitter coupled to the processor, the transmitter configured to transmit the positive integer quantity of control channel resource element groups.

25. The communications controller of claim 24, wherein the positive integer quantity of resource blocks is two resource blocks, wherein the two resource blocks are aligned horizontally, and wherein the processor is configured to assign the available resource elements in a column order within each of the two resource blocks.

26. The communications controller of claim 24, wherein the positive integer quantity of resource blocks is two resource blocks, wherein the two resource blocks are aligned vertically, and wherein the processor is configured to assign the available resource elements in a column order within each of the two resource blocks.

27. The communications controller of claim 24, wherein the positive integer quantity of resource blocks is two resource blocks, wherein the two resource blocks are aligned vertically, and wherein the processor is configured to assign the available resource elements in a column order spanning the two resource blocks.

28. The communications controller of claim 24, wherein the positive integer quantity of resource blocks is two resource blocks, and wherein the processor is configured to assign the available resource elements in a first resource block in a column order to a first portion of the positive integer quantity of control channel resource element groups, to assign the available resource elements in a second resource block in a column order to a second portion of the positive integer quantity of control channel resource element groups, and to assign previously unassigned available resource elements of the two resource blocks to an additional resource element group in the positive integer quantity of control channel resource element groups.

29. A communications device comprising:

a receiver configured to receive a resource block including a plurality of control messages interleaved within a positive integer quantity of control channel resource element groups defined in a data region of the resource block, the resource block having a total number of resource elements, the total number of resource elements consisting of available resource elements, reserved resource elements, and blocked available resource elements remaining after a plurality of potentially-available resource elements have been assigned to fill in each of the positive integer quantity of control channel resource element groups with a same number N available resource elements in each resource element group, wherein some of the reserved resource elements are muted, and wherein the positive integer quantity of control channel resource element groups exclude any resource elements mapped to reference signals; and a processor coupled to the receiver, the processor configured to de-interleave the plurality of control messages from the received resource block, and to select a control message for the communications device from the plurality of control messages.

30. The communications device of claim 29, wherein there are M reserved resource elements, where M is a positive integer value, wherein there are L unassigned available resource elements, where L is a positive integer value, and wherein M plus L is a multiple of 2.

31. The communications device of claim 29, wherein N is equal to 4.

* * * * *